United States Patent
Mori

(10) Patent No.: US 9,726,573 B2
(45) Date of Patent: Aug. 8, 2017

(54) OPTICAL FREQUENCY DOMAIN REFLECTOMETRY, OPTICAL FREQUENCY DOMAIN REFLECTOMETER, AND DEVICE FOR MEASURING POSITION OR SHAPE USING THE SAME

(71) Applicant: ANRITSU CORPORATION, Kanagawa (JP)

(72) Inventor: Takashi Mori, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 120 days.

(21) Appl. No.: 14/829,778

(22) Filed: Aug. 19, 2015

(65) Prior Publication Data

US 2017/0052091 A1    Feb. 23, 2017

(51) Int. Cl.
| | | |
|---|---|---|
| *G01B 9/02* | (2006.01) | |
| *G01M 11/08* | (2006.01) | |
| *G02B 6/02* | (2006.01) | |
| *G02B 6/27* | (2006.01) | |
| *G01L 1/24* | (2006.01) | |
| *G01B 11/24* | (2006.01) | |

(Continued)

(52) U.S. Cl.
CPC ........... *G01M 11/088* (2013.01); *G01B 11/14* (2013.01); *G01B 11/2441* (2013.01); *G01L 1/246* (2013.01); *G02B 6/02042* (2013.01); *G02B 6/02085* (2013.01); *G02B 6/2753* (2013.01); *G02B 2006/12138* (2013.01)

(58) Field of Classification Search
CPC  G01B 11/16; G01B 11/2441; G01B 9/02004; G01L 311/16; G01L 311/2441; G01L 1/246; G01L 39/02004; G01M 11/088; G02B 6/3594

See application file for complete search history.

(56) References Cited

U.S. PATENT DOCUMENTS

| | | | | |
|---|---|---|---|---|
| 8,773,650 B2 * | 7/2014 | Froggatt | ................. | G01B 11/18 356/73.1 |
| 2006/0081772 A1 * | 4/2006 | Williams | .............. | G01B 11/161 250/227.14 |
| 2006/0285850 A1 * | 12/2006 | Colpitts | .................. | G01B 11/16 398/108 |

FOREIGN PATENT DOCUMENTS

| | | |
|---|---|---|
| JP | 2013505441 A | 2/2013 |
| WO | 2011034584 A3 | 7/2011 |
| WO | 2013136247 A1 | 9/2013 |

* cited by examiner

Primary Examiner — Michael A Lyons
Assistant Examiner — Maurice Smith
(74) Attorney, Agent, or Firm — Pearne & Gordon LLP

(57) ABSTRACT

To eliminate a need for polarization adjustment, to simplify a configuration, and to make a configuration at low cost. Wavelength swept light is provided to a measurement-target optical fiber having an FBG with a chirped grating interval. A polarization multiplexing unit generates polarization multiplexed reference light by multiplexing first reference light and second reference light, which are swept in a wavelength in the same manner as wavelength swept light and have polarizations orthogonal to each other. Polarization multiplexed reference light is input to combine means along with reflected light from measurement-target optical fiber and is made to interfere with reflected light. A signal processing unit performs Fourier transform processing on the digital signal by dividing a time domain into a plurality of periods, and synthesizes the Fourier transform results on a distance axis to obtain a measurement result of orthogonal polarization components of reflected light.

14 Claims, 21 Drawing Sheets

(51) Int. Cl.
*G01B 11/14* (2006.01)
*G02B 6/12* (2006.01)

CL : Collimator

OPTICAL FREQUENCY DOMAIN REFLECTOMETRY, OPTICAL FREQUENCY DOMAIN REFLECTOMETER, AND DEVICE FOR MEASURING POSITION OR SHAPE USING THE SAME

TECHNICAL FIELD

The present invention relates to a technique for measuring a strain distribution of a measurement-target optical fiber, and in particular, to a technique for inputting light with a swept wavelength to a measurement-target optical fiber as measurement light and measuring two orthogonal polarization components of reflected light from the measurement-target optical fiber with respect to measurement light.

BACKGROUND ART

A strain measurement of an optical fiber using optical frequency domain reflectometry (OFDR) has been hitherto performed.

The basic configuration of an optical frequency domain reflectometer (hereinafter, simply referred to as a measurement device) 200 is shown in FIG. 18. In FIG. 18, a wavelength swept light source 1 includes a semiconductor laser, and outputs wavelength swept light P0 whose frequency changes linearly with respect to time.

Wavelength swept light P0 is input to split means 3 constituted of an optical coupler or the like and is split into two light beams, and one split light beam P1 is guided to one end of a measurement-target optical fiber 38 through directional coupling means 31 constituted of an optical circulator or the like as measurement light Pmes.

Reflected light Pret which is reflected inside the measurement-target optical fiber 38 and returned to one end is input to combine means 41 constituted of an optical coupler or the like through the directional coupling means 31. The other split light beam P2 (=reference light Pr) split by the split means 3 is also input to the combine means 41, and reflected light Pret interferes with reference light Pr.

In two light beams Psum(+) and Psum(−) output from the combine means 41, the phases of the light beams interfering with each other are opposite to each other. The two light beams Psum(+) and Psum(−) output from the combine means 41 are input to a balanced photodetector 55 to detect a beat signal due to interference of reflected light Pret from the measurement-target optical fiber 38 and reference light Pr.

An analog electrical signal A output from the balanced photodetector 55 is converted to a digital signal D by an A/D converter 65, and is subject to Fourier transform processing or the like in a signal processing unit 90.

Here, as shown in FIG. 19(a), three reflection points of a point, b point, and c point are assumed in the measurement-target optical fiber 38, and the distances from an end point o of the measurement-target optical fiber 38 are referred to as La, Lb, and Lc.

If the optical path length from the split means 3 to the combine means 41 while being folded at the end point o of the measurement-target optical fiber 38 is made equal to the optical path length from the split means 3 to the combine means 41 through which reference light Pr propagates, light Preta reflected from the a point of the measurement-target optical fiber 38 is combined by the combine means 41 while being delayed by the time ta=2nLa/c compared to reference light Pr. Here, n is a refractive index of the measurement-target optical fiber 38, and c is the speed of light. Similarly, light Pretb and light Pretc reflected from the b point and the c point are delayed by the time tb=2nLb/c and the time tc=2nLc/c.

Accordingly, as shown in FIG. 19(b), an optical frequency vr of reference light Pr, an optical frequency va of reflected light from the a point, an optical frequency vb of reflected light from the b point, and an optical frequency vc of reflected light from the c point have change characteristics (in this case, lines having a constant inclination) of the optical frequency of reference light Pr in terms of time while being delayed by the time ta to tc.

If an optical frequency variation per unit time of wavelength swept light P0 is S, a beat frequency due to interference of reflected light Preta from the a point and reference light Pr is as follows.

$$fa = |va - vr| = S \cdot ta = (2nS/c)La \qquad (1)$$

Similarly, beat frequencies due to interference of reflected light from the b point and the c point and reference light are as follows.

$$fb = |vb - vr| = S \cdot tb = (2nS/c)Lb \qquad (2)$$

$$fc = |vc - vr| = S \cdot tc = (2nS/c)Lc \qquad (3)$$

Accordingly, in the signal processing unit 90, if Fourier transform is performed on the digital signal D, as shown in FIG. 19(c), beat signals having frequencies fa, fb, and fc proportional to the distances La, Lb, and Lc from one end of the measurement-target optical fiber 38 to the reflection points are observed. It is assumed that reflectance at each point is sufficiently small, and multiple reflection is ignored.

As described above, the longitudinal distribution of reflection from the measurement-target optical fiber can be measured by the optical frequency domain reflectometry.

If light is continuously reflected in the longitudinal direction due to Rayleigh scattering of the measurement-target optical fiber and longitudinal strain of the measurement-target optical fiber is applied, the phase of reflected light due to Rayleigh scattering changes.

For this reason, the longitudinal distribution of fine strain of the measurement-target optical fiber can be measured by observing the phase of the beat signals obtained by the optical frequency domain reflectometry described above.

Patent Document 1 describes a method which applies the optical frequency domain reflectometry described above to a multicore fiber having a plurality of cores and measures the position or the shape of the fiber.

In the configuration example of FIG. 18 described above, although polarization of light is not considered, in a normal single mode fiber, polarization of light is not maintained and polarization is changed with bending of the fiber; therefore, there is a problem in that, if reflected light from the measurement-target optical fiber is orthogonal to polarization of reference light, beat signals due to interference are not obtained. When the optical fiber is bent, birefringence with different refractive indexes is generated depending on the polarization state of light, and affects a phase measurement by the optical frequency domain reflectometry.

In order to solve the problem, a polarization diversity system is used in which light having two orthogonal polarization states is incident on an optical fiber while switching for each sweep, and each polarization state is separated and measured into two orthogonal polarization components of reflected light from the optical fiber.

FIG. 20 shows a configuration example of a measurement device 210 using a polarization diversity system of the related art. In the measurement device 210, similarly to the measurement device 200 shown in FIG. 18 described above, wavelength swept light P0 output from a wavelength swept light source 1 is split into two beams by split means 3; however, one split light beam P1 is input to a polarization controller 15. The polarization controller 15 switches the polarization state of emission light to a first polarization state and a second polarization state orthogonal to the first polarization state, and the two polarization states are switched by a controller 16 each time a wavelength sweep is performed with the wavelength swept light source 1.

Similarly, output light P1' of the polarization controller 15 is input to the measurement-target optical fiber 38 through directional coupling means 31 as measurement light Pmes, and reflected light Pret from the measurement-target optical fiber 38 with respect to measurement light Pmes is input to combine means 41 through the directional coupling means 31.

The other light beam P2 split by the split means 3 is input to a polarization controller 25. The polarization controller 25 is adjusted such that the intensities of reference light split into two light beams by polarization separation means 45 and 46 described below become substantially equal. The polarization controller 25 is not required when the polarization state of wavelength swept light P0 is set in advance such that the intensities of reference light split into two light beams by the polarization separation means 45 and 46 become substantially equal.

A light beam P2' output from the polarization controller 25 is input to the combine means 41 as reference light Pr along with reflected light Pret from the measurement-target optical fiber 38 and combined with reflected light Pr, and reflected light Pret and reference light Pr interfere with each other. As described above, in the two light beams Psum(+) and Psum(−) output from the combine means 41, the phases of light interfering with each other are opposite to each other, one light beam Psum(+) is input to the polarization separation means 45 constituted of a polarization beam splitter (PBS) or the like and split into two orthogonal polarization components s(+) and p(+). The other light beam Psum(−) is input to the polarization separation means 46 constituted of a PBS or the like and split into two orthogonal polarization components s(−) and p(−).

The separated polarization components s(+) and s(−) are input to a balanced photodetector 55, and an electrical signal As proportional to the difference in light intensity of the polarization components s(+) and s(−) is output and converted to a digital signal Ds by an A/D converter 65. Similarly, the separated polarization components p(+) and p(−) are input to a balanced photodetector 56, and an electrical signal Ap proportional to the difference in light intensity of the polarization components p(+) and p(−) is output and converted to a digital signal Dp by an A/D converter 66.

The digital signals Ds and Dp are input to a signal processing unit 91 constituted of a CPU or the like and subjected to Fourier transform processing.

Patent Document 1 discloses a technique which, in the measurement device 210 configured as above, when the Fourier transform results of the digital signals Ds and Dp obtained when a wavelength sweep is performed with the polarization controller 15 set in the first polarization state are respectively a and b, and the Fourier transform results of the digital signals Ds and Dp obtained when a wavelength sweep is performed with the polarization controller 15 set in the second polarization state are respectively c and d, corrects birefringence of the measurement-target optical fiber 38 from the four Fourier transform results a, b, c, and d.

Even when birefringence of the measurement-target optical fiber 38 is not corrected, in a normal single mode fiber, polarization of light is not maintained and polarization is changed with bending of the fiber; therefore, in order to solve a problem in that, if reflected light from the measurement-target optical fiber and polarization of reference light are orthogonal to each other, a beat signal by interference is not obtained, the polarization controller 25, the polarization separation means, and two sets of photodetectors and A/D converters are required, and the polarization controller 25 needs to be adjusted such that the intensities of reference light split into two light beams by the polarization separation means are substantially equal.

FIG. 21 shows a configuration example of another measurement device 220 using a polarization diversity system of the related art. In the measurement device 220, output light P0 from a wavelength swept light source 1 is provided to a polarization controller 15 before being split by split means 3, and the polarization state of output light is switched to a first polarization state and a second polarization state orthogonal to the first polarization state for each wavelength sweep.

Then, reflected light Pret from the measurement-target optical fiber 38 and reference light Pr are combined by combine means 41, and combined light Psum is input to a polarization controller 25. Similarly to the above, the polarization controller 25 is adjusted such that the intensities of reference light split into two light beams by polarization separation means 45 described below become substantially equal.

Output light Psum' of the polarization controller 25 is separated into light in polarization states s and p by the polarization separation means 45.

In FIG. 21, instead of the balanced photodetectors 55 and 56 of FIG. 20, single-end photodetectors 57 and 58 are used. A digital signal Ds is obtained from light in the polarization state s, a digital signal Dp is obtained from light in the polarization state p, and as described referring to FIG. 20, birefringence of the measurement-target optical fiber 38 can be corrected by the method described in Patent Document 1 from Fourier transform results a and b obtained when a wavelength sweep is performed with the polarization state of output light of the polarization controller 15 set in the first polarization state and Fourier transform results c and d obtained when a wavelength sweep is performed with the polarization state of output light of the polarization controller 15 set in the second polarization state.

FIG. 22 shows the configuration of a measurement device 230 which measures a three-dimensional position or shape using a multicore fiber 39 with the configuration shown in FIG. 21 as a basic configuration.

In the measurement device 230, output light P0 from the wavelength swept light source 1 is split by split means 2, similarly to the above, one split light beam P1 is input to a polarization controller 15, and the other split light beam P2 is input to a monitoring unit 70.

As shown in FIG. 23, the monitoring unit 70 splits input light P2 into two light beams by split means 71, provides one light beam to a gas cell 72 of hydrogen cyanide (HCN), measures power of light passing through the gas cell 72 by a photodetector 73 and an A/D converter 74, and outputs the measurement result to a signal processing unit 92. The signal processing unit 92 calibrates the absolute wavelength of the wavelength swept light source 1 according to the absorption wavelength of gas.

The other light beam split by split means 71 is provided to a delay interferometer constituted of an optical coupler 81, a delay fiber 82, and Faraday rotator type mirrors 83 and 84. The output of the delay interferometer is measured by a photodetector 85 and an A/D converter 86. A sine wave of a beat frequency according to a change in the optical frequency of the wavelength swept light source 1 is obtained from the output of the delay interferometer. In the actual wavelength swept light source 1, the change in the optical frequency with respect to time is not completely linear; therefore, the signal processing unit 92 performs correction processing on nonlinearity of a wavelength sweep using the output of the delay interferometer described above.

On the other hand, similarly to the above, light P1' whose polarization state is switched for each wavelength sweep is output from the polarization controller 15 and split into four light beams by split means 30. The four split light beams P3 to P6 are respectively input to split means 3A to 3D and split into measurement light Pmes1 to Pmes4 and reference light Pr1 to Pr4, and the four measurement light Pmes1 to Pmes4 are input to a fan-out 35 for a multicore fiber respectively through directional coupling means 31A to 31D and input to respective cores of one measurement-target multicore fiber 39.

Reflected light Pret1 to Pret4 from the respective cores of the measurement-target multicore fiber 39 are respectively input to combine means 41A to 41D through the fan-out 35 for a multicore fiber and the directional coupling means 31A to 31D.

Reference light Pr1 to Pr4 are also respectively input to the combine means 41A to 41D, and similarly to the configuration of FIG. 21, reflected light from the respective cores of the measurement-target multicore fiber 39 and reference light are combined and respectively separated into two polarization components (s1,p1) to (s4,p4) by polarization separation means 45A to 45D upon receiving the output. The two polarization components (s1,p1) to (s4,p4) are converted to electrical signals by photodetectors 57A to 57D and 58A to 58D, the electrical signals are converted to digital signals (Ds1,Dp1) to (Ds4,Dp4) by A/D converters 65A to 65D and 66A to 66D, and the digital signals (Ds1,Dp1) to (Ds4,Dp4) are input to the signal processing unit 92. Similarly to the above, polarization controllers 25A to 25D are adjusted such that the intensities of reference light split into two light beams by the subsequent polarization separation means 45A to 45D become substantially equal.

With this configuration, similarly to FIG. 21, birefringence can be corrected and the strain distributions of the respective cores of the measurement-target multicore fiber 39 can be measured. In addition, the position or the shape of the measurement-target multicore fiber 39 can be calculated from the strain distributions of the respective cores.

Patent Document 2 describes a method which uses a fiber Bragg grating (FBG) as a measurement-target optical fiber. The reflectance of the FBG is higher than the reflectance of Rayleigh scattering; therefore, it is possible to reduce the influence of reflection in the termination of the measurement-target optical fiber, an optical connector, the directional coupling means (optical circulator), or the like and crosstalk of the measurement-target multicore fiber or the fan-out. In addition, with the use of the FBG with a chirped reflection wavelength, reflected light is obtained over a wide wavelength sweep range, and the dynamic range of the photodetector can be suppressed.

RELATED ART DOCUMENT

Patent Document

[Patent Document 1] International Publication No. WO-2011034584
[Patent Document 2] International Publication No. WO-2013136247

DISCLOSURE OF THE INVENTION

Problem that the Invention is to Solve

In the optical frequency domain reflectometry using the polarization diversity system of the related art, there is a problem in that, in order to detect light having two orthogonal polarization components, two photodetectors and two A/D converters are required per core, and the polarization controller 25 is adjusted such that the intensities of reference light split into two light beams by the polarization separation means become substantially equal. In addition, as described above, in a device which uses a multicore fiber as a measurement-target optical fiber, there is a problem in that the device becomes large in size and cost is increased due to an increase in the number of cores.

The invention has been accomplished in order to solve the above-described problems, and an object of the invention is to provide optical frequency domain reflectometry, an optical frequency domain reflectometer, and a device for measuring a position or a shape using the same capable of detecting two orthogonal polarization components of reflected light from a measurement-target optical fiber with a set of a photodetector and an A/D converter, eliminating a need for polarization adjustment for polarization separation, and even when a multicore fiber is used as a measurement-target optical fiber, achieving reduction in size and a configuration at low cost.

Means for Solving the Problem

In order to achieve the object, according to a first aspect of the present invention, there is provided an optical frequency domain reflectometry including: a step of generating measurement light and reference light having the same wavelength sweep characteristic as wavelength swept light from wavelength swept light which is swept in a wavelength continuously in a predetermined range; a step of outputting the measurement light to a measurement-target optical fiber having a fiber Bragg grating with a chirped grating interval; a step of receiving the reference light and generating polarization multiplexed reference light by multiplexing first reference light and second reference light having polarizations orthogonal to each other with a predetermined time difference shorter than a time during which light reciprocates the fiber Bragg grating; a step of receiving reflected light from the measurement-target optical fiber with respect to the measurement light, combining and inputting the reflected light and the polarization multiplexed reference light to a photodetector, and outputting a beat produced by interference of the reflected light and the polarization multiplexed reference light as an electrical signal; a step of converting the electrical signal to a digital signal; a step of dividing a time domain of the digital signal by a single wavelength sweep into a plurality of periods during which a beat frequency produced by interference of the reflected light and the first reference light included in the polarization multiplexed reference light and a beat frequency produced by interference of the reflected light and the second reference light included in the polarization multiplexed reference light do not overlap each other and performing Fourier transform processing on the digital signal; and a step of synthesizing Fourier transform results obtained for the plurality of periods on a distance axis to obtain a measurement result of two orthogonal polarization components of the reflected light.

According to a second aspect of the invention, in the optical frequency domain reflectometry according to the first aspect, the step of generating the measurement light and the reference light may include a step of alternately switching and generating first measurement light and second measurement light having orthogonal polarizations as the measurement light for each wavelength sweep, in the step of performing the Fourier transform processing, the Fourier transform processing on the digital signal is performed for the first measurement light and the second measurement light by dividing a time domain into the plurality of periods, and in the step of obtaining the measurement result, the measurement result of the two orthogonal polarization components of the reflected light from the measurement-target optical fiber is obtained for the first measurement light and the second measurement light.

According to a third aspect of the invention, there is provided an optical frequency domain reflectometer including: a wavelength swept light source which outputs wavelength swept light which is swept in a wavelength continuously in a predetermined range; split means for receiving and splitting the wavelength swept light in a first optical path; directional optical coupling means for receiving first split light split by the split means and output to a second optical path as measurement light, outputting the first split light to a measurement-target optical fiber having a fiber Bragg grating with a chirped grating interval, and receiving reflected light from the measurement-target optical fiber with respect to the measurement light; a polarization multiplexing unit which receives second split light split by the split means and output to a third optical path and outputs polarization multiplexed reference light generated by multiplexing first reference light and second reference light having the same wavelength sweep characteristic as the wavelength swept light and orthogonal polarizations with a predetermined time difference shorter than a time during which light reciprocates the fiber Bragg grating; combine means for combining the polarization multiplexed reference light and the reflected light output from the directional optical coupling means; a photodetector which receives output light of the combine means and outputs a beat produced by interference of the reflected light and the polarization multiplexed reference light as an electrical signal; an A/D converter which converts the electrical signal to a digital signal; and a signal processing unit which divides a time domain of the digital signal obtained by a single waveform sweep into a plurality of periods during which a beat frequency produced by interference of the reflected light and the first reference light included in the polarization multiplexed reference light and a beat frequency produced by interference of the reflected light and the second reference light included in the polarization multiplexed reference light do not overlap each other, performs Fourier transform on the digital signal, and synthesizes Fourier transform results obtained for the plurality of periods on a distance axis to obtain a measurement result of two orthogonal polarization components of the reflected light.

According to a fourth aspect of the invention, the optical frequency domain reflectometer according to the third aspect may further include polarization switching means inserted into one of the first optical path and the second optical path and for receiving the wavelength swept light or the first split light and switching and outputting first measurement light and second measurement light having the same wavelength sweep characteristic as the wavelength swept light and orthogonal polarizations for each wavelength sweep, in which the signal processing unit divides and performs the Fourier transform processing on a digital signal obtained by combining reflected light from the measurement-target optical fiber and the polarization multiplexed reference light for the first measurement light and the second measurement light into the plurality of periods, and obtains the measurement result of the two orthogonal polarization components of the reflected light from the measurement-target optical fiber for the first measurement light and the second measurement light.

According to a fifth aspect of the invention, in the optical frequency domain reflectometer according to the third aspect, the measurement-target optical fiber may be divided into a plurality of domains in a longitudinal direction, and each of the plurality of domains may have a fiber Bragg grating with a chirped grating interval, and the signal processing unit may perform Fourier transform processing on a digital signal obtained when the wavelength of the measurement light is swept once by dividing the time domain into a plurality of periods during which a beat frequency produced by interference of reflected light from the plurality of domains of the measurement-target optical fiber with respect to the measurement light and the first reference light included in the polarization multiplexed reference light and a beat frequency produced by interference of the reflected light from the plurality of domains of the measurement-target optical fiber with respect to the measurement light and the second reference light included in the polarization multiplexed reference light do not overlap each other.

According to a sixth aspect of the invention, in the optical frequency domain reflectometer according to the fifth aspect, the predetermined time difference of the polarization multiplexing unit may be set to be shorter than a time during which light reciprocates in any domain of the measurement-target optical fiber.

According to a seventh aspect of the invention, in the optical frequency domain reflectometer according to the fifth aspect, reflection wavelength ranges of the plurality of domains of the measurement-target optical fiber may be formed so as to partially overlap each other, and a wavelength sweep range of the wavelength swept light source may reach a portion where the reflection wavelength ranges of the measurement-target optical fiber overlap each other.

According to an eighth aspect of the invention, in the optical frequency domain reflectometer according to the third aspect, the measurement-target optical fiber may be a multicore fiber having a plurality of M cores or more, and in order to provide the measurement light to a plurality of M cores among the cores of the multicore fiber and to obtain beat signals obtained by interference of reflected light from the plurality of M cores and the polarization multiplexed reference light, a plurality of M sets of the directional coupling means, the combine means, the photodetectors, and the A/D converters may be provided.

According to a ninth aspect of the invention, in the optical frequency domain reflectometer according to the third aspect, the measurement-target optical fiber may be a multicore fiber having a plurality of M cores or more, and a plurality of M sets of directional coupling means may be provided in order to provide the measurement light to a plurality of M cores among the cores of the multicore fiber and to receive reflected light from the plurality of M cores with respect to the measurement light. The optical frequency domain reflectometer further includes reflected light multiplexing means for multiplexing reflected light from the plurality of M cores through the directional coupling means, and means for applying a delay time difference such that reflected light from the plurality of M cores is multiplexed with different delay times for the respective cores in the reflected light multiplexing means. Processing on the output of the reflected light multiplexing means may be performed with one set of the combine means, the photodetector, and the A/D converter.

According to a tenth aspect of the invention, in the optical frequency domain reflectometer according to the eighth aspect, M may be 4.

According to an eleventh aspect of the invention, in the optical frequency domain reflectometer according to the ninth aspect, M may be 4.

According to a twelfth aspect of the invention, there is provided a device for measuring a position or a shape which measures the position or the shape of a measurement object, to which a measurement-target optical fiber is fixed, using the optical frequency domain reflectometer according to the eighth aspect.

According to a thirteenth aspect of the invention, in the device according to the twelfth aspect, the measurement object may be a medical catheter, a medical inspection probe, a medical sensor, a construction inspection sensor, a sea-floor sensor, or a geographical sensor.

According to a fourteenth aspect of the invention, there is provided a strain distribution measurement system for an optical fiber including a measurement-target optical fiber which has a fiber Bragg grating at a chirped grating interval, and the optical frequency domain reflectometer according to the third aspect.

Advantage of the Invention

As described above, in the invention, the wavelength swept light output from the wavelength swept light source is provided to the measurement-target optical fiber as the measurement light. The polarization multiplexed reference light generated by multiplexing the first reference light and the second reference light having orthogonal polarizations with the predetermined time difference shorter than the time during which light reciprocates the fiber Bragg grating of the measurement-target optical fiber is used as reference light. The Fourier transform processing is performed by dividing a time domain into a plurality of periods during which the beat frequency produced by interference of the reflected light from the measurement-target optical fiber and the first reference light included in the polarization multiplexed reference light and the beat frequency produced by interference of the reflected light from the measurement-target optical fiber and the second reference light included in the polarization multiplexed reference light do not overlap each other. The Fourier transform results obtained for the plurality of periods are synthesized on the distance axis, thereby obtaining the measurement result of the two orthogonal polarization components of the reflected light.

That is, the first reference light and the second reference light having orthogonal polarizations are made to interfere with the reflected light obtained from the measurement-target optical fiber upon receiving the measurement light with the predetermined time difference to obtain the beats, and the Fourier transform processing is performed by dividing the time domain into the periods such that the beat frequencies do not overlap. Therefore, it is possible to separate and obtain the two orthogonal polarization components of the reflected light by calculation, to eliminate a need for optical polarization separation processing and polarization adjustment processing for the optical polarization separation processing in the related art device, and to realize a simple configuration in which one set of the photodetector and the A/D converter is provided per core of the measurement-target optical fiber.

As described above, since one set of the photodetector and the A/D converter is provided per core, even when a measurement-target optical fiber is a multicore fiber, a device can be configured simply at low cost.

BEST MODE FOR CARRYING OUT THE INVENTION

Figure 1:
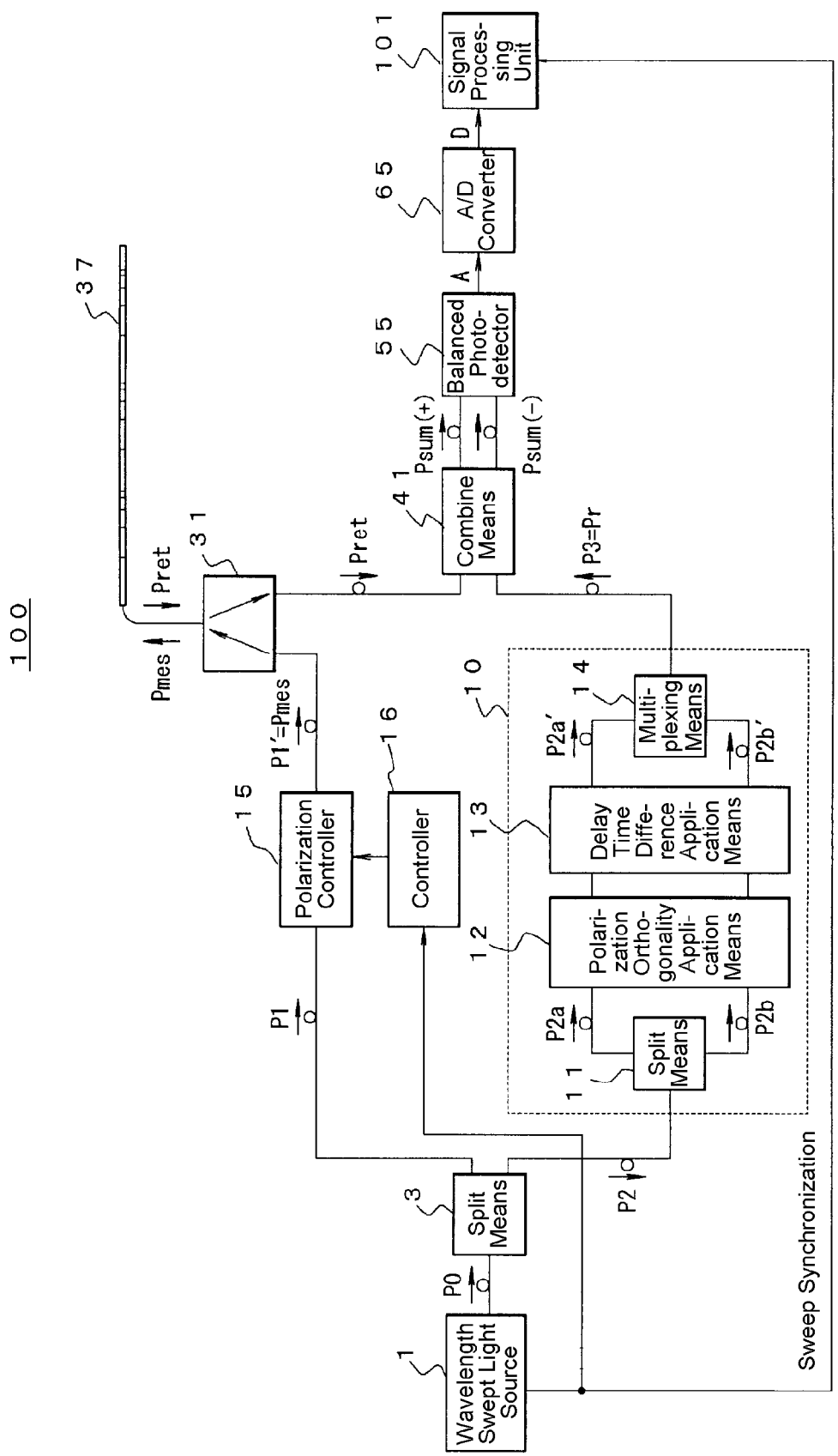
FIG. 1 is a configuration diagram of an embodiment of the invention.

Hereinafter, an embodiment of the invention will be described referring to the drawings.

FIG. 1 shows a configuration example of an optical frequency domain reflectometer (hereinafter, simply referred to as a measurement device) 100 to which the invention is applied. In the following configuration example, the same components as the components of the related art device described above are represented by the same reference numerals.

In FIG. 1, a wavelength swept light source 1 of the measurement device 100 sweeps the wavelength of output light P0 with a prescribed wavelength range and a sweep rate. The wavelength swept light source 1 can be realized with, for example, a configuration in which a lasing wavelength is swept by changing a resonance wavelength with a change in the angle of a diffraction grating or a mirror in an external cavity laser using a diffraction grating.

In general, in the optical frequency domain reflectometry, ideally, a sweep is performed such that the frequency of light is changed linearly with respect to time; however, the sweep is not limited thereto, and a sweep may be performed such that the wavelength of light is changed linearly with respect to time, or a sweep may be performed such that the wavelength of light is changed in a sinusoidal manner. In addition, when a wavelength sweep width is sufficiently small with respect to a center wavelength, in a sweep where the wavelength is changed linearly, the optical frequency is substantially changed linearly. In the case of a sinusoidal sweep, when only a domain comparatively close to a line in the sine wave is used, this can be regarded as a sweep close to a line. As described below, nonlinearity of a sweep can also be corrected using a delay interferometer.

Output light P0 of the wavelength swept light source 1 is input to split means 3 constituted of an optical fiber coupler or the like through a predetermined optical path (first optical path) and split into two light beams, one split light beam P1 is input to a polarization controller 15 inserted into an optical path (second optical path) from the split means 3 to directional coupling means 31, and the other split light beam P2 is input to a polarization multiplexing unit 10 inserted into an optical path (third optical path) between the split means 3 and combine means 41.

Here, wavelength swept light has a single polarization, and any of a linear polarization, a circular polarization, and an elliptic polarization may be used.

The polarization controller 15 constitutes polarization switching means of this example along with a controller 16. The polarization controller 15 receives the split light beam P1 and controls the polarization of the split light beam P1 to alternately switch and output first measurement light and second measurement light having orthogonal polarizations each time a wavelength sweep is performed with the wavelength swept light source 1.

Although the polarization controller 15 is controlled by the controller 16 so as to alternately output two orthogonal polarization states for each wavelength sweep of wavelength swept light, bidirectional wavelength sweep may be used for a measurement, and polarization states may be switched between a forward direction and a backward direction, or only a forward direction of a wavelength sweep may be used for a measurement and polarization states may be changed between an even-numbered forward direction and an odd-numbered forward direction.

The polarization multiplexing unit 10 receives the split light beam P2 split by the split means 3 and outputs light generated by multiplexing first reference light and second reference light having the same wavelength sweep characteristic as wavelength swept light P0 and orthogonal polarizations with a predetermined time difference $\Delta T$ as polarization multiplexed reference light. Basically, the polarization multiplexing unit 10 applies polarization orthogonality between two light beams P2a and P2b split by split means 11 by polarization orthogonality application means 12, applies a predetermined time difference $\Delta T1$ to the two light beams having orthogonal polarizations by delay time difference application means 13, multiplexes the two light beams, and outputs multiplexed light. It is assumed that the time difference $\Delta T1$ is shorter than a time during which light reciprocates a fiber Bragg grating described below or a time during which light reciprocates any domain of a measurement-target optical fiber. The polarization orthogonality application means 12 and the delay time difference application means 13 may be reversed.

Here, the orthogonal polarizations mean that a first polarization state E1 and a second polarization state E2 represented by Jones vectors are in the relationship of $E1 \cdot E2^* = 0$ (here, symbol · represents an inner product, and symbol * represents a complex conjugate), or that a second polarization state becomes a point symmetrical to a point representing a first polarization state on a Poincare sphere with respect to the center of the Poincare sphere.

For example, when the polarization of one light beam is a linear polarization, a light beam having a linear polarization at an angle of 90 degrees with respect to the linear polarization of one light beam is generated as the other light beam, and both light beams are multiplexed by applying a predetermined time difference. On the other hand, when the polarization of one light beam is a circular polarization, a light beam having a circular polarization with an opposite rotation direction is generated as the other light beam, and both light beams are multiplexed by applying a predetermined time difference. In addition, when the polarization of one light beam is an elliptic polarization, a light beam having an elliptic polarization with a major axis of an ellipse at 90 degrees with respect to the elliptic polarization of one light beam, the same ellipticity, and an opposite rotation direction is generated as the other light beam, and both light beams are multiplexed by applying a predetermined time difference.

Figure 2:
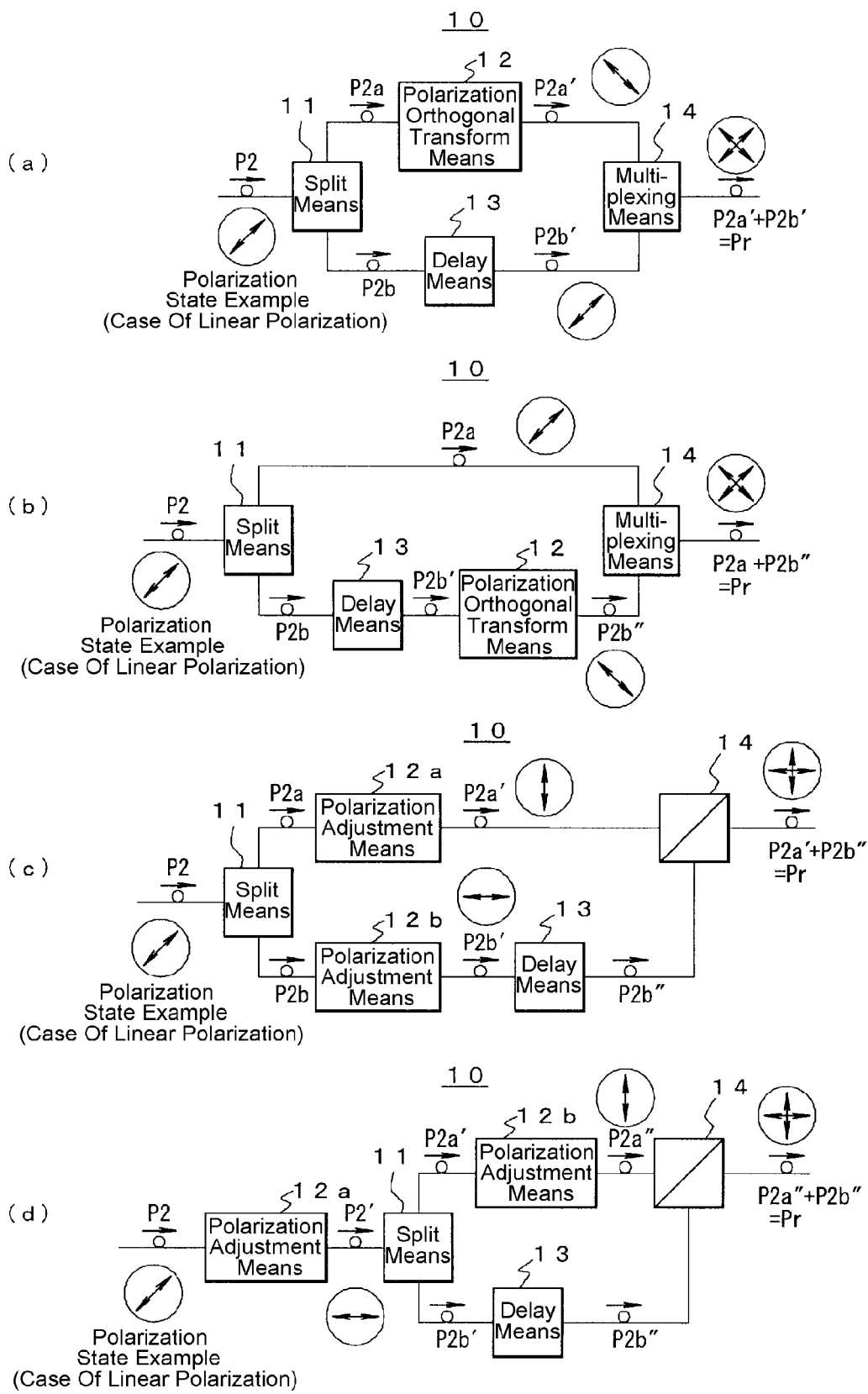
FIG. 2 is a diagram showing a configuration example of a main part of the embodiment of the invention.

FIG. 2 shows a more specific configuration example of the polarization multiplexing unit 10. In FIG. 2(a), one light beam P2a split by the split means 11 is input to polarization orthogonal transform means 12, and a light beam P2a' (first reference light) having a polarization orthogonal to input light is generated. The polarization orthogonal transform means 12 can be constituted of, for example, a polarization controller in which a fiber is wound circularly a predetermined number of times or a polarization controller in which a half-wave plate or a quarter-wave plate is combined. The other light beam P2b split by the split means 11 is delayed by a predetermined time ΔT by delay means 13, such as a delay fiber, and the delayed light beam P2b' (second reference light) and a light beam P2a' having a polarization orthogonally converted are multiplexed by multiplexing means 14. FIG. 2 shows an example where the polarization of input light is a linear polarization.

When an optical fiber having a refractive index n and a length ΔL1 is used as the delay means 13, a time difference ΔT1 becomes nΔL1/c. Here, c is the speed of light.

Actually, if the other side of the output optical path of the split means 11 is constituted of a fiber in which a polarization is not maintained, the polarization of light on the other side of the output optical path of the split means 11 is changed; therefore, it is desirable that a polarization controller capable of adjusting a polarization state is used as the polarization orthogonal transform means 12 such that, when multiplexing two light beams by the multiplexing means 14 constituted of an optical coupler, the polarization states of the two light beams are orthogonal to each other (the Jones vectors are in the relationship of E1·E2*=0, or the polarization states become point symmetrical to each other on the Poincare sphere with respect to the center of the Poincare sphere).

A given delay time exists in the polarization orthogonal transform means 12, such as a polarization controller; therefore, the delay time (fiber length or the like) of the delay means 13 is set such that, when multiplexing the two light beams by the multiplexing means 14, the delay time difference between the two light beams becomes ΔT1.

In FIG. 2(a), although the polarization orthogonal transform means 12 is arranged on one side of the output of the split means 11, and the delay means 13 is arranged on the other side, as shown in FIG. 2(b), both the polarization orthogonal transform means 12 and the delay means 13 may be arranged on one side of the split means 11, or the polarization orthogonal transform means 12 and the delay means 13 are reversed. That is, when multiplexing the two light beams by the multiplexing means 14, the polarizations may be orthogonal to each other and the time difference may be the predetermined value ΔT1, or the delay time of one of the two light beams may be greater than that of the other light beam.

The polarization multiplexing unit 10 may multiplex two light beams which have orthogonal polarizations and have a delay time difference; therefore, a configuration other than those shown in FIGS. 2(a) and 2(b) can be made. For example, as shown in FIG. 2(c), a polarization beam splitter (PBS) may be used as the multiplexing means 14. In this case, the polarizations of two light beams need to conform to the PBS, and two polarization adjustment means 12a and 12b constituted of a polarization controller or the like are required as the polarization orthogonality application means; however, since there is no loss of 3 dB when multiplexing two light beams by the multiplexing means constituted of an optical fiber coupler, low loss is achieved.

As shown in FIG. 2(d), one of the two polarization adjustment means 12a and 12b may be arranged in front of the split means 11.

Figure 3:
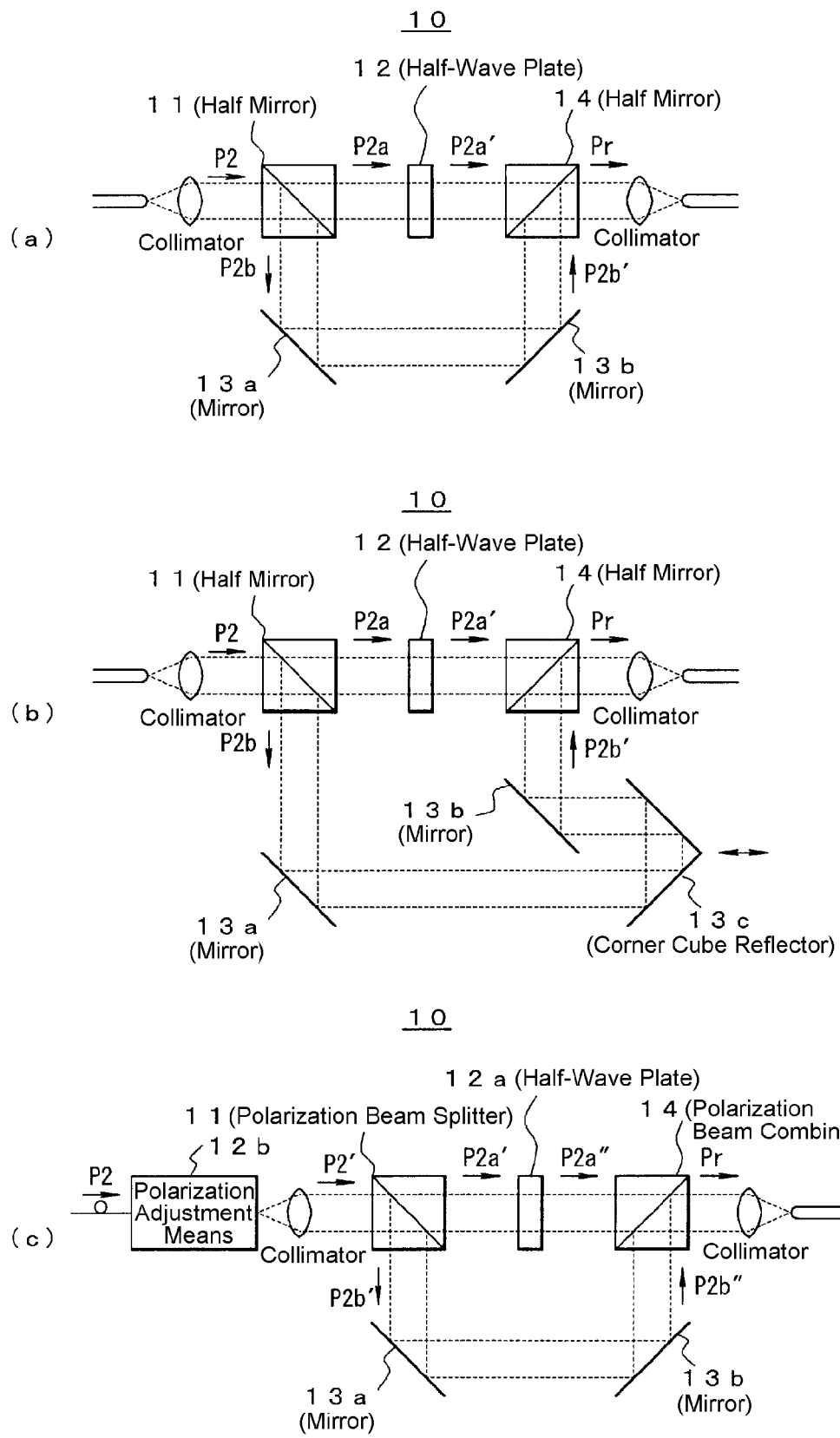
FIG. 3 is a diagram showing an example where a main part of the embodiment of the invention is constituted of a free-space optical system.

The polarization multiplexing unit 10 may be constituted of a free-space optical system as shown in FIG. 3. FIG. 3(a) shows an example where half mirrors 11 and 14 are used as split means and multiplexing means, two mirrors 13a and 13b are used as delay means, and a half-wave plate 12 capable of adjusting a rotation angle is used as orthogonal transform means, and FIG. 3(b) shows an example where a corner cube reflector 13c is provided in delay means to adjust a delay time difference. FIG. 3(c) shows an example where polarization beam splitter 11 and polarization beam combiner 14 are used as split means and multiplexing means, and fiber type polarization adjustment means 12b and a free space type half-wave plate 12a are combined as orthogonal transform means. Besides, a fiber type element and a free space type element may be arbitrarily combined.

Measurement light Pmes which is output from the polarization controller 15 for each wavelength sweep while being switched between first measurement light and second measurement light is input to a measurement-target optical fiber 37 through directional coupling means 31 constituted of an optical circulator or the like. Processing of the device of this example on first measurement light and second measurement light is the same; therefore, in the following description, both first measurement light and second measurement light are simply referred to as measurement light without distinction therebetween.

Figure 4:
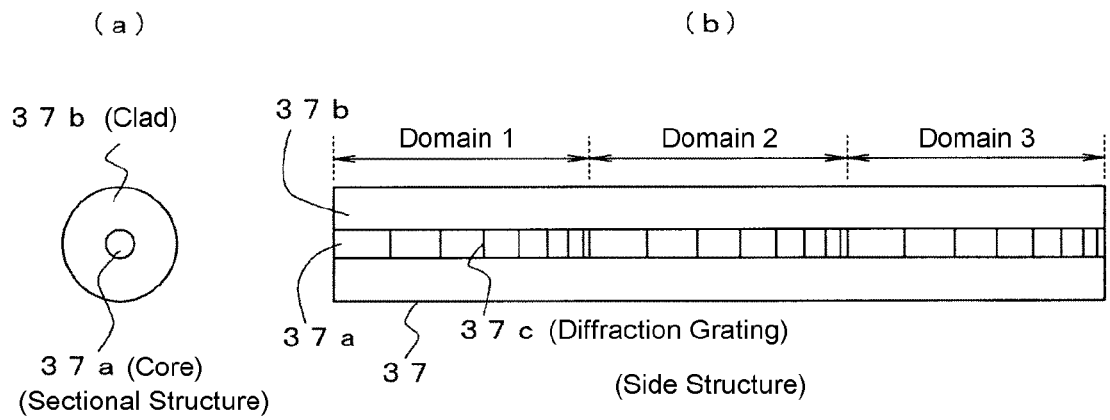
FIG. 4 is a diagram showing a structure example of a measurement-target optical fiber.

Here, as shown in FIG. 4, the measurement-target optical fiber 37 is an optical fiber including a fiber Bragg grating (FBG), in which the period Λ between diffraction gratings 37c in a core 37a is chirped (changed in the longitudinal direction), and the reflection wavelength λ of the FBG is represented by λ=2 nΛ. n is the refractive index of the core.

Accordingly, as shown in FIG. 5(a), the reflection wavelength of the chirped FBG changes depending on a distance. Although it is desirable that the reflected light frequency is changed linearly with respect to the distance, the change is not necessarily linear, and the reflection wavelength may be changed linearly with respect to the distance.

Figure 5:
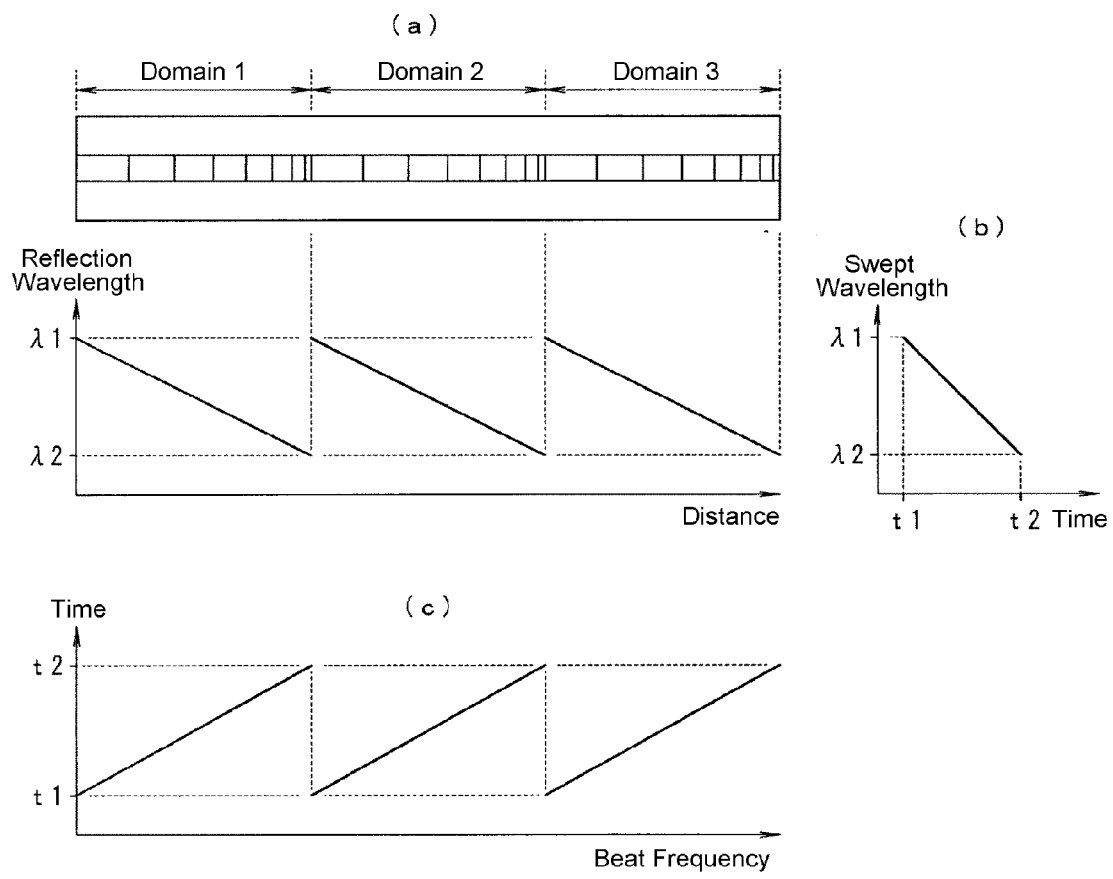
FIG. 5 is a diagram showing the relationship between a reflection wavelength characteristic of a measurement-target optical fiber and a swept wavelength.

In FIGS. 4 and 5, although three domains are schematically shown, the number of domains may be one or a plural number. The chirped FBG having a domain length of centimeters can be easily manufactured; therefore, in a measurement-target optical fiber having a full length of meters, an optical fiber may be divided into about 100 domains.

In FIGS. 4 and 5, although a change in the diffraction grating interval is exaggerated, in an actual chirped FBG, for example, the width of change in the reflection wavelength is about several tens of nm when the center of the reflection wavelength is 1550 nm. In FIG. 5(a), although an example where the grating interval is chirped from a long wavelength to a short wavelength when viewed from the left side of the drawing is shown, conversely, the grating interval may be chirped from a short wavelength to a long wavelength.

When light whose wavelength is swept as shown in FIG. 5(b) is input to the measurement-target optical fiber 37 having such a reflection wavelength characteristic, the position of reflection by the FBG is changed with time. When the reflectance of the FBG is small, multiple reflection by the FBG having a plurality of domains is negligible, and light is reflected and returned from the measurement-target optical fiber 37 for each domain of the FBG.

In the optical frequency domain reflectometry described above, the beat is generated by interference of reflected light Pret from the measurement-target optical fiber 37 and reference light Pr; however, since the beat frequency corresponds to the distance of the measurement-target optical fiber, as shown in FIG. 5(c), peaks of a beat spectrum are generated as much as the number of domains of the FBG for wavelength swept light, and the peak frequency is changed with time. Here, in order to obtain measurement results continuous in the longitudinal direction of the measurement-target optical fiber, each domain of the FBG needs to be arranged with no gap, and a wavelength sweep range λ1 to λ2 needs to be equal to or greater than a reflection wavelength length of the FBG (FIG. 5 shows an example where the wavelength sweep range λ1 to λ2 matches the reflection wavelength range of the FBG).

FIG. 5 shows an example of a beat spectrum obtained by interference of reflected light of wavelength swept light when wavelength swept light is input to the chirped FBG and one reference light beam. Actually, in the measurement device 100 of the embodiment, polarization multiplexed reference light generated by multiplexing two reference light beams having two orthogonal polarizations with a predetermined time difference is input, and the operation thereof will be described below.

Reflected light Pret from the measurement-target optical fiber 37 with the chirped FBG is input to the combine means 41 through the directional coupling means 31. The directional coupling means 31 may be constituted of an optical fiber coupler or a half mirror, other than an optical circulator. The combine means 41 can be constituted of an optical fiber coupler or a half mirror. It is preferable that two combined light beams having an inverted phase relationship of light beams to be combined can be output in consideration of the use of a balanced photodetector as a photodetector; however, as described below, only one combined light beam may be used.

Two light beams Psum(+) and Psum(−) obtained by combining reflected light Pret and reference light Pr are output from the combine means 41. In the two light beams, the phases of light beams interfering with each other are opposite to each other, and the phases of beats due to interference of two light beams are opposite to each other.

The combined light beams Psum(+) and Psum(−) are input to a balanced photodetector 55, and an electrical signal A proportional to the difference in light intensity between the input light beams Psum(+) and Psum(−) from the balanced photodetector 55 is output and converted to a digital signal D by an A/D converter 65. The balanced photodetector has a structure in which two light receiving elements (for example, photodiodes) independently receiving input light beams are connected in series, and a signal is extracted from the connection point of the two light receiving elements, or is constituted of two light receiving elements and a differential amplifier.

As described above, in the light beams Psum(+) and Psum(−), the phases of the beats are opposite to each other; therefore, the light beams are input to the balanced photodetector, whereby the beat signals to be obtained have double amplitude. Then, since noise due to fluctuation in intensity of the wavelength swept light source 1 is cancelled, and random noise becomes $\sqrt{2}$ times in amplitude, a signal-to-noise ratio is improved.

Figure 6:
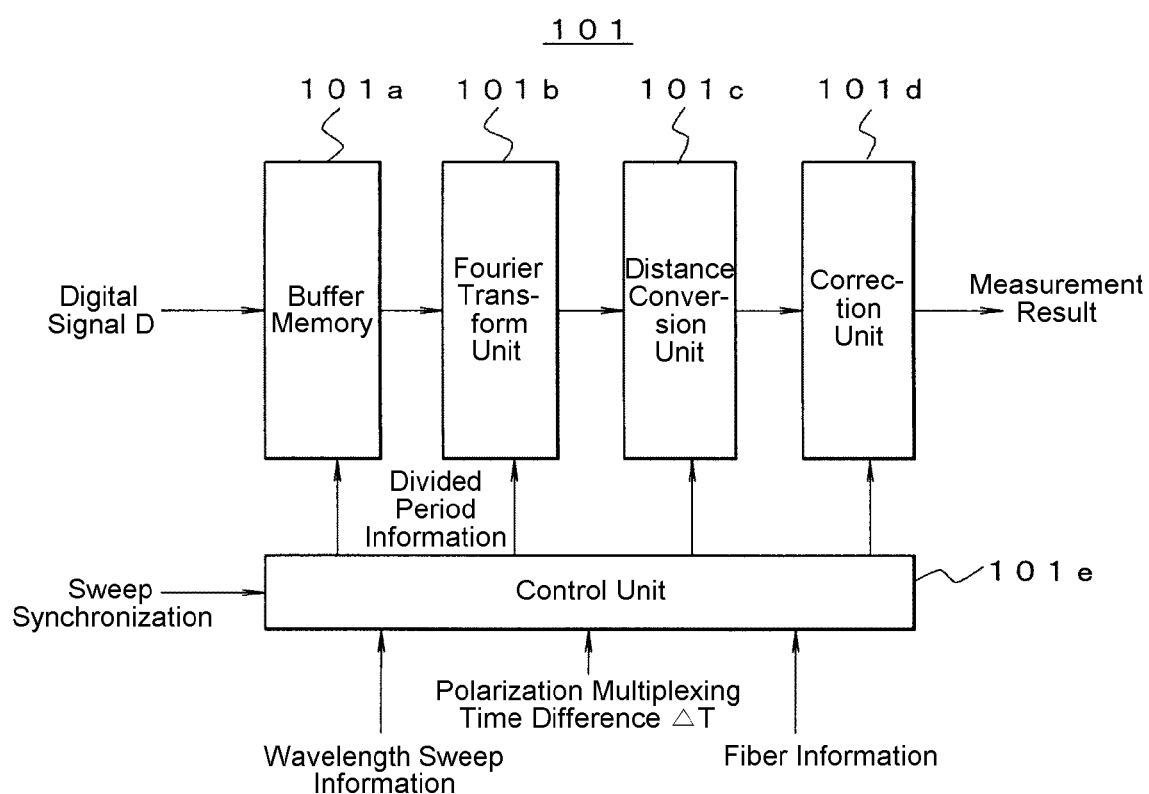
FIG. 6 is a diagram showing a configuration example of a signal processing unit of the embodiment of the invention.

The output D of the A/D converter 65 is input to a signal processing unit 101. As shown in FIG. 6, the signal processing unit 101 includes, for example, a buffer memory 101a which temporarily stores a digital signal, a Fourier transform unit 101b which performs Fourier transform on the digital signal temporarily stored, a distance conversion unit 101c which converts a result obtained on a frequency axis with Fourier transform in terms of information of distance of the measurement-target optical fiber, a correction unit 101d which performs correction processing of birefringence or the like, and a control unit 101e which controls the units.

The control unit 101e receives wavelength sweep information, such as the swept wavelength range, information of a multiplexing time difference (ΔT1) in the polarization multiplexing unit, and information relating to the measurement-target optical fiber 37 while taking sweep synchronization with the wavelength swept light source 1, and performs setting of necessary parameters and control for the respective units. In particular, a time domain of a digital signal obtained by a single wavelength sweep is divided into a plurality of periods during which beat frequencies produced with the use of polarization multiplexed light as reference light do not overlap each other, and a plurality of periods are designated for the Fourier transform unit 101b.

The Fourier transform unit 101b divides and performs Fourier transform on the digital signal into the periods designated by the control unit 101d. Calculation processing by the correction unit 101d is the same as the processing described in Patent Document 1, and thus, detailed description thereof will not be repeated.

(Description of Measurement Principle)

Next, the principle that orthogonal polarization components can be separated and detected from reflected light from the measurement-target optical fiber 37 will be described.

The measurement-target optical fiber 37 is an optical fiber having the same chirped FBG as shown in FIG. 4. If the chirped FBG is measured with the optical frequency domain reflectometry, peaks of a beat spectrum are generated as much as the number of cycles of the chirp, and the frequency is changed in a given ratio with time. For example, a chirp has a grating interval on a distant end side shorter than on a near end side, a chirp cycle is three cycles, a sweep of a light source is performed in a direction in which the frequency of light is increased with time, and the optical path length of reference light from the split means 3 to the combine means 41 is shorter than the optical path length from the split means 3 to the combine means 41 while being reflected at the near end of the measurement-target optical fiber 37, like a solid line of FIG. 7(a), three peaks of a beat spectrum where the frequency is increased with time are obtained.

Then, in the measurement device 100 of this example, polarization multiplexed reference light generated by multiplexing the first reference light (for example, in the s polarization state) and the second reference light (for example, in the p polarization state and delayed by the time ΔT1 with respect to the first reference light) is used. Accordingly, if reflected light from the measurement-target optical fiber 37 and polarization multiplexed reference light are combined by the combine means 41, a beat is generated due to interference of the s polarization component of reflected light from the measurement-target optical fiber 37 and the first reference light, and a beat is generated due to interference of the p polarization component of reflected light from the measurement-target optical fiber 37 and second reference light.

Here, since second reference light is delayed by the time ΔT1 compared to the first reference light, peaks of a beat spectrum corresponding to the p polarization component of reflected light have a frequency lower than peaks of a beat spectrum corresponding to the s polarization component of reflected light.

Figure 7:
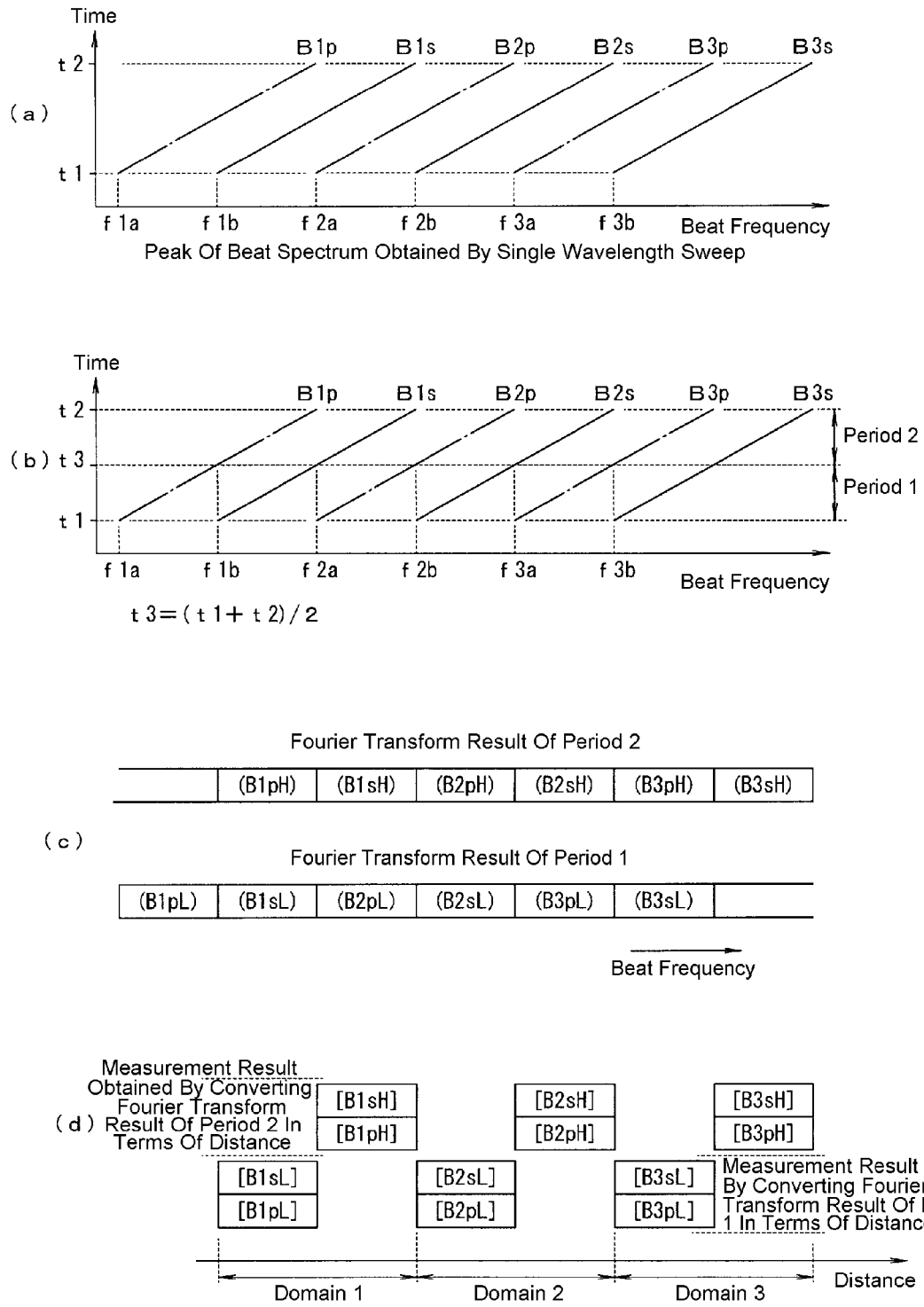
FIG. 7 is an operation explanatory view when Fourier transform of the embodiment of the invention is performed by dividing a time domain into two periods.

For example, if an optical path length difference ΔL1 of the polarization multiplexing unit 10 is set to be ½ of an optical path length for reciprocation of the chirp cycle of the FBG, like a one-dot-chain line of FIG. 7(a), peaks B1p to B3p of the beat spectrum corresponding to the p polarization component of reflected light are generated at frequency positions deviated from peaks B1s to B3s of the beat spectrum corresponding to the s polarization component of reflected light in a low frequency direction by ½ of the peak interval.

Here, when viewing a time range t1 to t2 as a whole, a frequency range in which a peak represented by a solid line is taken and a frequency range in which a peak representing a nearby one-dot-chain line is taken overlap each other by substantially half, and even if Fourier transform is performed to include the range in which the frequencies overlap each other, it is not possible to correctly obtain the strain distribution in the longitudinal direction of the measurement-target optical fiber 37.

Accordingly, in the measurement device 100 of the embodiment, as in FIG. 7(b), the time domain is divided into a plurality (in this example, two) of periods such that the frequency ranges of the peaks do not overlap each other, and Fourier transform (for example, fast Fourier transform (FFT) using CPU or FPGA) is performed for each divided period.

FIG. 7(c) shows results of Fourier transform processing performed for two periods. Through the Fourier transform processing for each period, Fourier transform results (B1sL) to (B3sL) and (B1sH) to (B3sH) corresponding to the s polarization component of reflected light and Fourier transform results (B1pL) to (B3pL) and (B1pH) to (B3pH) corresponding to the p polarization component of reflected light are separately obtained.

In regard to the results obtained in FIG. 7(c), if the horizontal axis is converted to the distance on the measurement-target optical fiber 37, the Fourier transform results (B1pL) to (B3pL) and (B1pH) to (B3pH) corresponding to the p polarization component of reflected light are corrected to the distant end side by ½ of the optical path length difference ΔL1 of the polarization multiplexing unit 10, and as in FIG. 7(d), the results corresponding to the s polarization component of reflected light and the results of the p polarization component of reflected light are obtained over the full distance range.

In this way, the beat spectrum corresponding to the s polarization component of reflected light overlaps the beat spectrum corresponding to the p polarization component of reflected light within the full measurement time. Accordingly, Fourier transform is performed by dividing the full measurement time into a plurality of domains without significantly increasing the bandwidth of the photodetector or the A/D converter or a sampling frequency after the A/D converter compared to a case where only the beat spectrum corresponding to the s polarization component of reflected light is measured, whereby both the beat spectrum corresponding to the s polarization component of reflected light and the beat spectrum corresponding to the p polarization component of reflected light can be separately obtained with one set of the photodetector and the A/D converter.

If a strain is partially applied to the measurement-target optical fiber 37, the grating interval of the FBG is changed due to the strain, and the peaks of the beat spectrum of FIG. 7(a) are deviated from the line. There is a case where the one-dot-chain line of FIG. 7(a) is deviated from the middle of the solid line due to an error in the optical path length difference ΔL1. It is desirable that a strain is measured continuously in the longitudinal direction of the measurement-target optical fiber 37 without a defect; however, since it is difficult to arrange the chirped FBG with no gap, it is desirable that the chirped FBG is arranged to be partially overlapped (the structure will be described below). Then, it is difficult to set the wavelength sweep range such that the peaks of the beat spectrum are arranged with no gap; therefore, it is desirable to set the wavelength sweep range such that the peaks of the beat spectrum partially overlap each other.

From the situations, in the two-divided Fourier transform described above, the s polarization component and the p polarization component overlap each other and cannot be separated. In this case, it is possible to avoid overlapping by increasing the number of divisions on a time axis.

Figure 8:
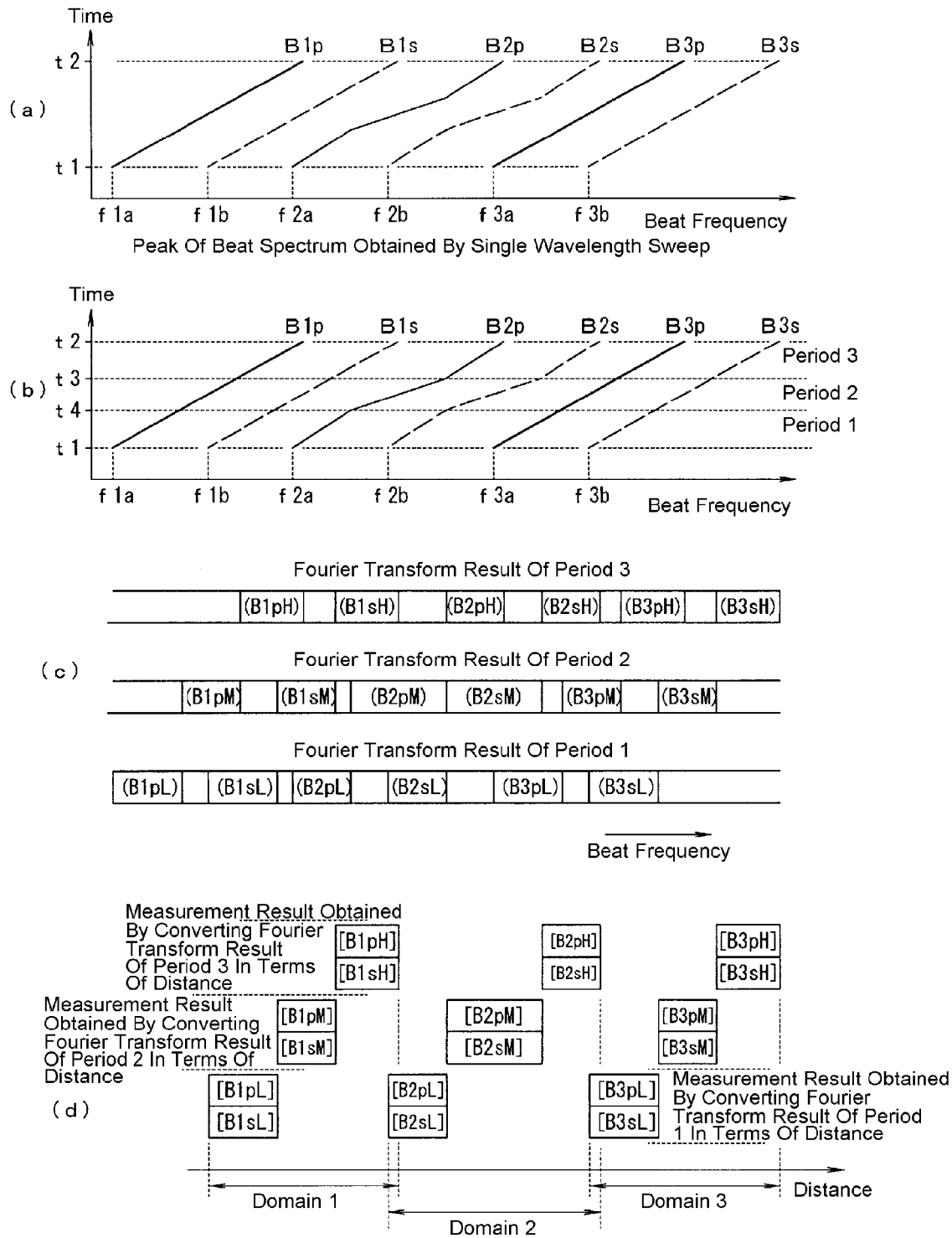
FIG. 8 is an operation explanatory view when Fourier transform of the embodiment of the invention is performed by dividing a time domain into three periods.

FIG. 8(a) shows an example where peaks B2p and B2s of a beat spectrum are not linear, there is an error in the optical path length difference ΔL1, and the peaks of the beat spectrum overlap each other.

In this case, as in FIG. 8(b), overlapping of the beat frequencies is avoided by division into periods 1 to 3 on a time axis, and as in FIG. 8(c), Fourier transform results (B1sL) to (B3sL), (B1sM) to (B3sM), and (B1sH) to (B3sH) of the s polarization component in the periods 1 to 3 and Fourier transform results (B1pL) to (B3pL), (B1pM) to (B3pM), and (B1pH) to (B3pH) of the p polarization component in the periods 1 to 3 are separately obtained, and if the horizontal axis is converted to the distance on the measurement-target optical fiber 37, as in FIG. 8(d), the results corresponding to the s polarization component and the p polarization component can be separately obtained over the full distance range.

Like the Fourier transform results of FIG. 8(c), the width of change of the beat frequency is different between the periods; however, both ends of the frequency can be detected by the amplitude (intensities) of the Fourier transform results.

Figure 9:
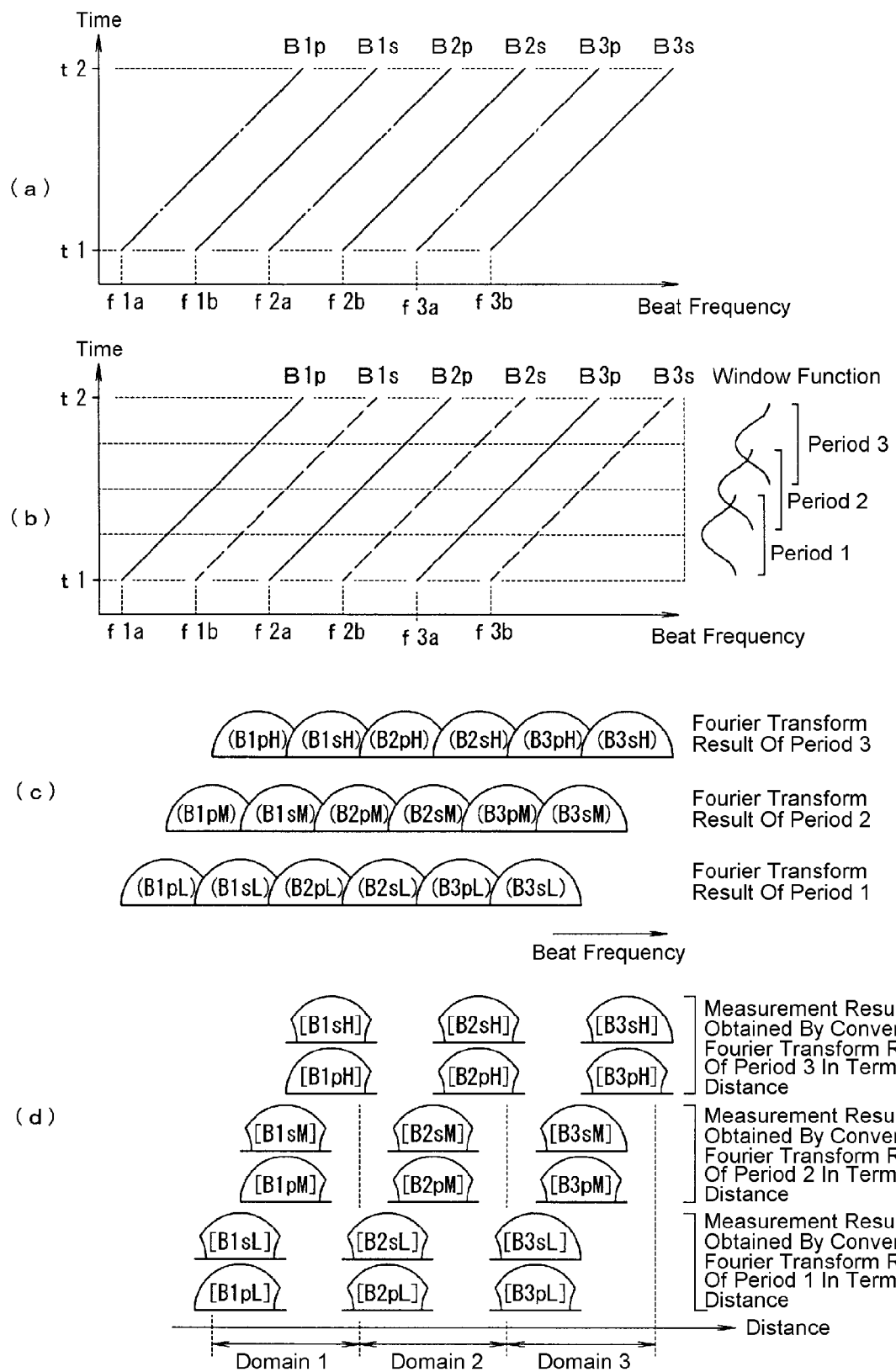
FIG. 9 is an operation explanatory view when Fourier transform of the embodiment of the invention is performed after window function processing.

In order to reduce a side lobe of a spectrum by Fourier transform, Fourier transform may be performed after a window function is applied. However, as in FIG. 7(b), if the time domain is divided into two periods and a window function is applied, there is a problem in that beat spectrums at positions corresponding to both end portions of the window function are not obtained. In this case, as in FIG. 9(a), the chirped FBG is partially overlapped (that is, solid-line portions and one-dot-chain portions overlap each other), and as in FIG. 9(b), if the window function is partially overlapped and three-divided Fourier transform is performed, as in FIG. 9(c), both ends of the beat spectrum of the s polarization component and the beat spectrum of the p polarization component partially overlap each other. Meanwhile, as in FIG. 9(d), the optical path length difference ΔL1 is corrected and a portion where both ends of the beat spectrums partially overlap each other is not used, whereby the results corresponding to the p polarization component and the s polarization component can be separately obtained over the full distance range as shown in the domains 1 to 3.

The direction of the chirp, the number of chirp cycles, the sweep direction of the light source, and the optical path length difference of the polarization multiplexing unit are not limited thereto. Even under other conditions, while the number of peaks of the beat spectrum, the direction of the temporal inclination, and the number of divisions of Fourier transform are different, the same effects can be obtained.

In this way, the measurement device 100 having the configuration of FIG. 1 distinguishes the polarization components of reflected light with two multiplexed reference light beams; therefore, the p polarization component and the s polarization component of reflected light can be separately measured with one set of the photodetector 55 and the A/D converter 65, it is not necessary to use optical polarization separation means and two sets of the photodetectors and the A/D converters, and the device configuration can be simplified.

As described above, since the optical polarization separation means is not required, a polarization controller which is adjusted such that the intensities of reference light split into two light beams by the polarization separation means like the related art is not required.

In the measurement device 100 of the example described above, the above-described processing is performed on reflected light for the first measurement light and reflected light for the second measurement light, and a digital signal for the polarization of the first measurement light and a digital signal for the polarization of the second measurement light are obtained.

Then, an s polarization component a and a p polarization component b of reflected light for the first measurement light and an s polarization component c and a p polarization component d of reflected light for the second measurement light are obtained, and birefringence of the measurement-target optical fiber 37 is corrected from the four signals a, b, c, and d using the method described in Patent Document 1 described above.

When the correction of birefringence of the measurement-target optical fiber 37 is not performed, the polarization controller 15 and the controller 16 can be removed from the measurement device 100. In a normal single mode fiber, the polarization of light is not maintained and the polarization is changed due to bending of the fiber; therefore, the polarization of reflected light from the measurement-target optical fiber 37 is undefined. Meanwhile, as described above, Fourier transform is performed by dividing the time domain into a plurality of periods on the time axis, whereby the s polarization component and the p polarization component of reflected light can be separately obtained. With this, for example, if the square sum of the s polarization component and the p polarization component of reflected light is obtained, the distribution of intensity of reflected light can be obtained without depending on the polarization of reflected light.

Figure 10:
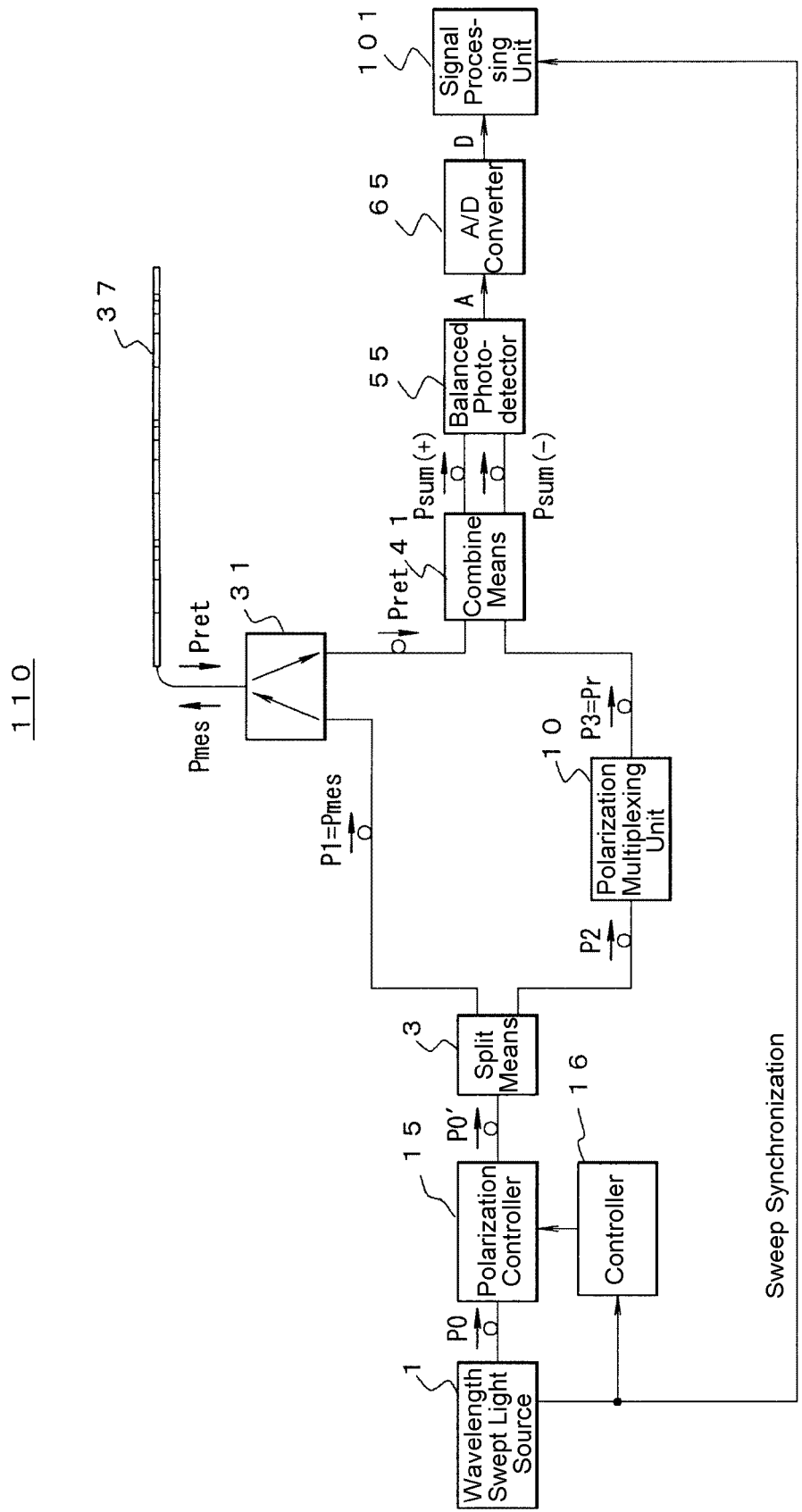
FIG. 10 is another configuration diagram of the embodiment of the invention.

In the measurement device 100 of the example described above, although the polarization controller 15 constituting the polarization switching means is inserted into the optical path between the split means 3 and the directional coupling means 31, like a measurement device 110 shown in FIG. 10, the polarization controller 15 may be inserted into an optical path between the wavelength swept light source 1 and the split means 3.

In this case, the polarization of reference light is switched for each wavelength sweep along with measurement light input to the measurement-target optical fiber by the polarization controller 15. For this reason, with respect to any of the digital signal for the first measurement light and the digital signal for the second measurement light, the result corresponding to the p polarization component of reflected light and the result corresponding to the s polarization component of reflected light are replaced with each other, or any of the result corresponding to the p polarization component of reflected light and the result corresponding to the s polarization component of reflected light is inverted in phase, making it possible to perform conversion to a case of reference light in the same polarization state.

Figure 11:
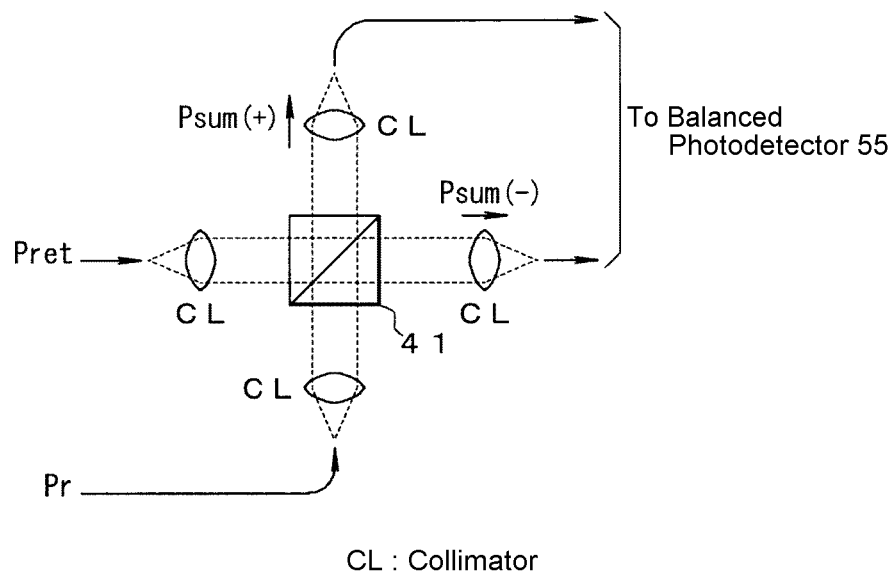
FIG. 11 is a diagram showing an example where a main part of the embodiment of the invention is constituted of a free-space optical system.

The combine means 41 may be constituted of a free-space optical system using a half mirror shown in FIG. 11.

Figure 12:
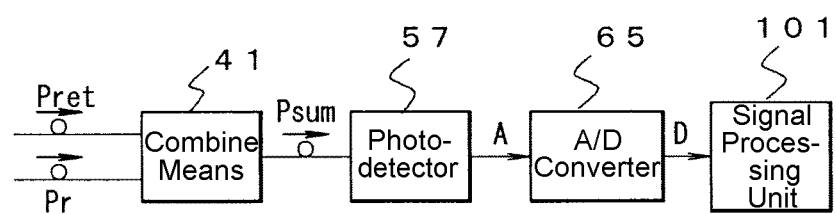
FIG. 12 shows a configuration example where combine means and a photodetector of the embodiment of the invention are single-ended.

As shown in FIG. 12, a configuration may be made, in which one combined light Psum output from the combine means 41 is received by a single-end photodetector 57. In this case, the combine means 41 may be constituted of any of an optical fiber optical system and a free-space optical system.

Figure 13:
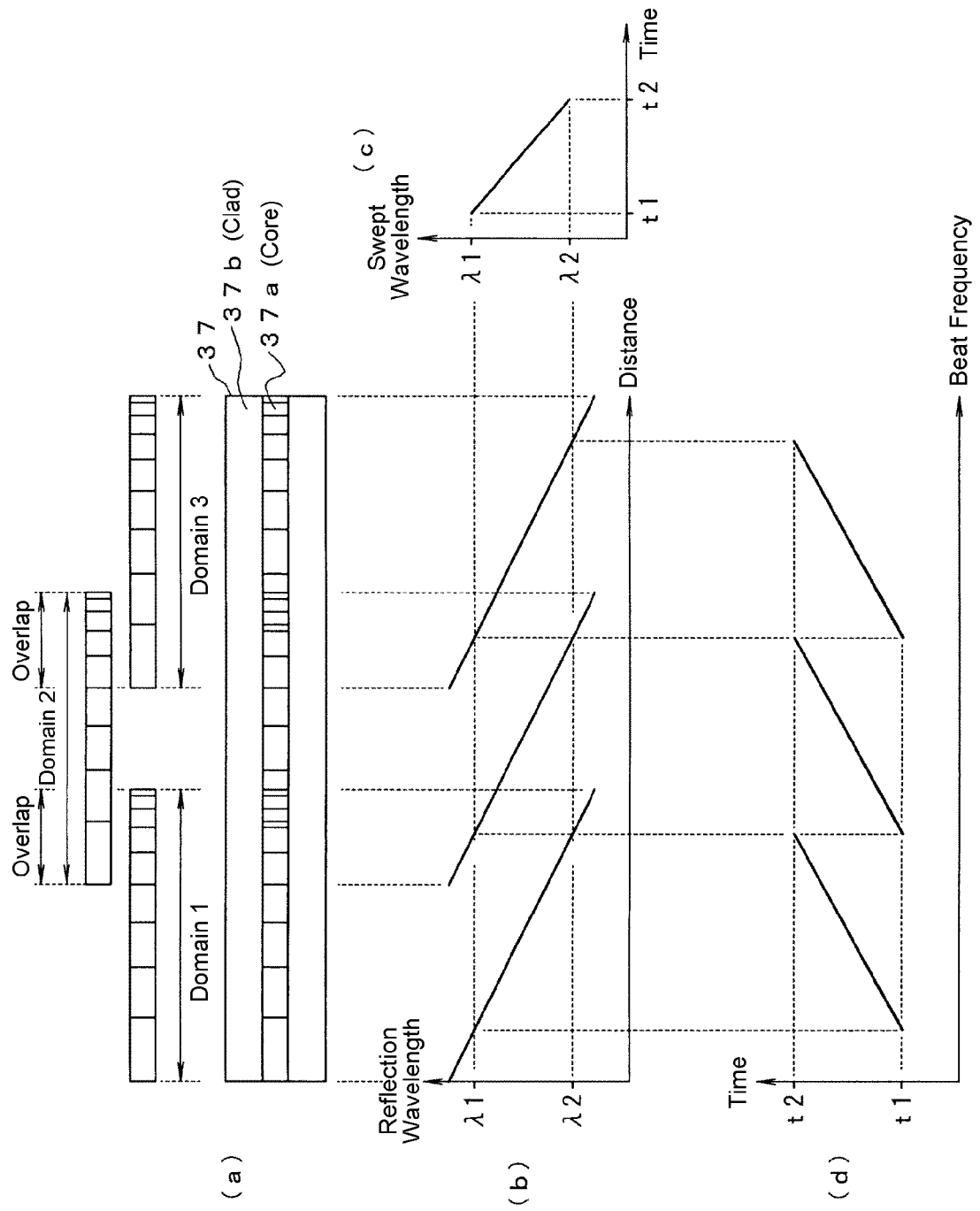
FIG. 13 is a diagram showing the relationship between a reflection wavelength characteristic of an optical fiber with an overlapping chirp domain and a swept wavelength.

Next, an example where the domains of the chirped FBG adjacent to each other in the longitudinal direction of the measurement-target optical fiber 37 partially overlap each other will be described referring to FIG. 13. As described above, since it is difficult to arrange the FBG having a plurality of domains with no gap, in this way, the domains 1 to 3 may partially overlap each other. In an overlapping portion, two diffraction gratings at different grating intervals exist, and reflection of two wavelengths occurs. For this reason, as shown in FIG. 13(b), the relationship between the distance and the reflection wavelength has an overlapping portion. The overlapping portions may be increased, and three or more domains may overlap each other. A limited wavelength sweep as in FIG. 13(c) is performed with respect to the characteristic of FIG. 13(b), whereby, as shown in FIG. 13(d), it is possible to prevent the peaks of the beat spectrum from overlapping each other.

Figure 14:
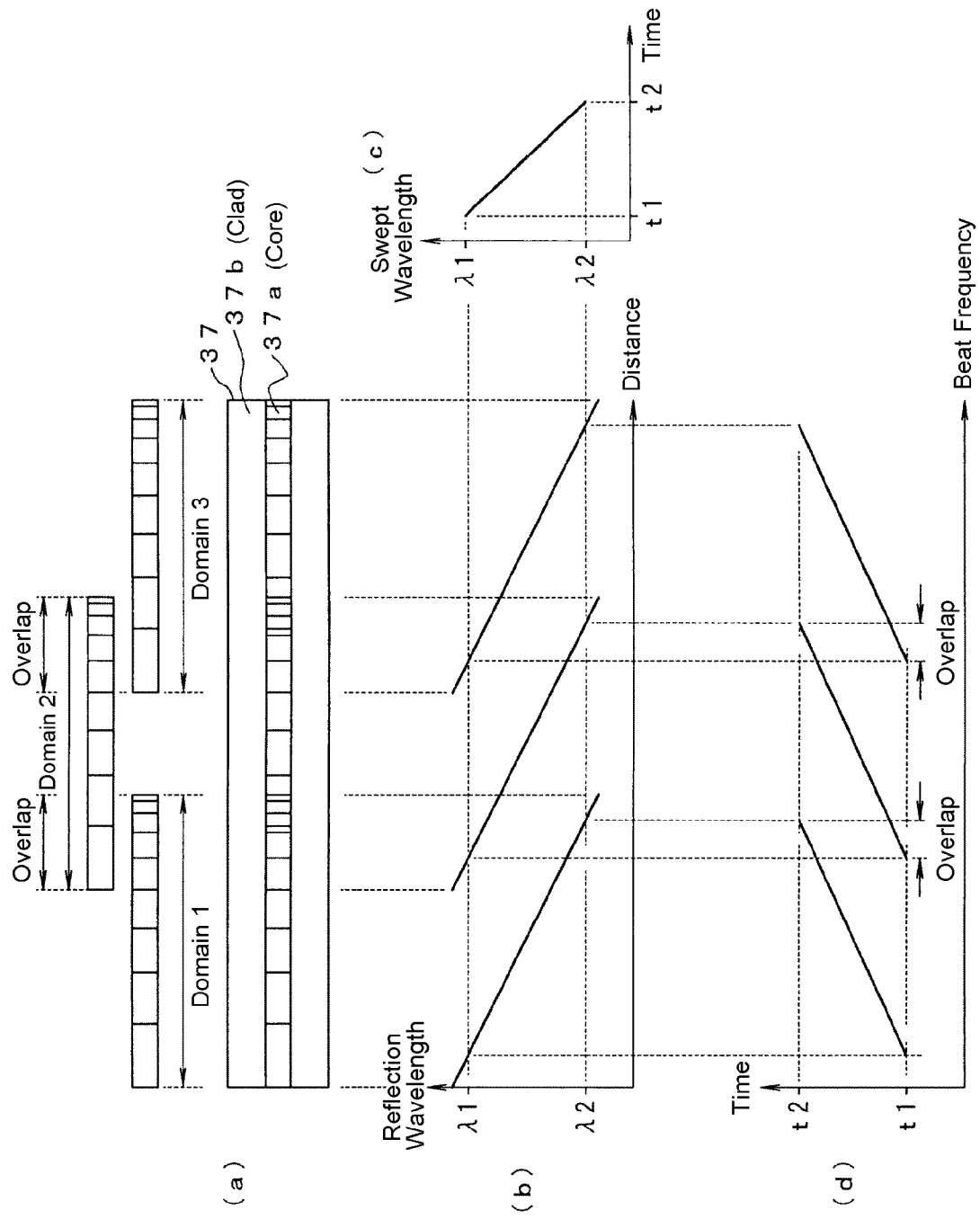
FIG. 14 is a diagram showing the relationship between a reflection wavelength characteristic of an optical fiber with an overlapping chirp domain and a swept wavelength.

FIG. 14 shows an example where the domains of the chirped FBG overlap each other and the peaks of the beat spectrum overlap each other. With respect to the characteristic of FIG. 14(b), the wavelength sweep range is set to be slightly narrower than the reflection wavelength range of the chirped FBG as in FIG. 14(c), and overlapping of the beat frequencies occurs as in FIG. 14(d). The wavelength sweep range of the wavelength swept light source 1 may be set to be equal to or wider than the reflection wavelength range of the chirped FBG. In this way, the domains of the chirped FBG are overlapped to relax positional accuracy when the chirped FBG is arranged, and the peaks of the beat spectrum are overlapped to relax setting accuracy of the wavelength sweep range of the wavelength swept light source 1 and to facilitate execution.

Figure 15:
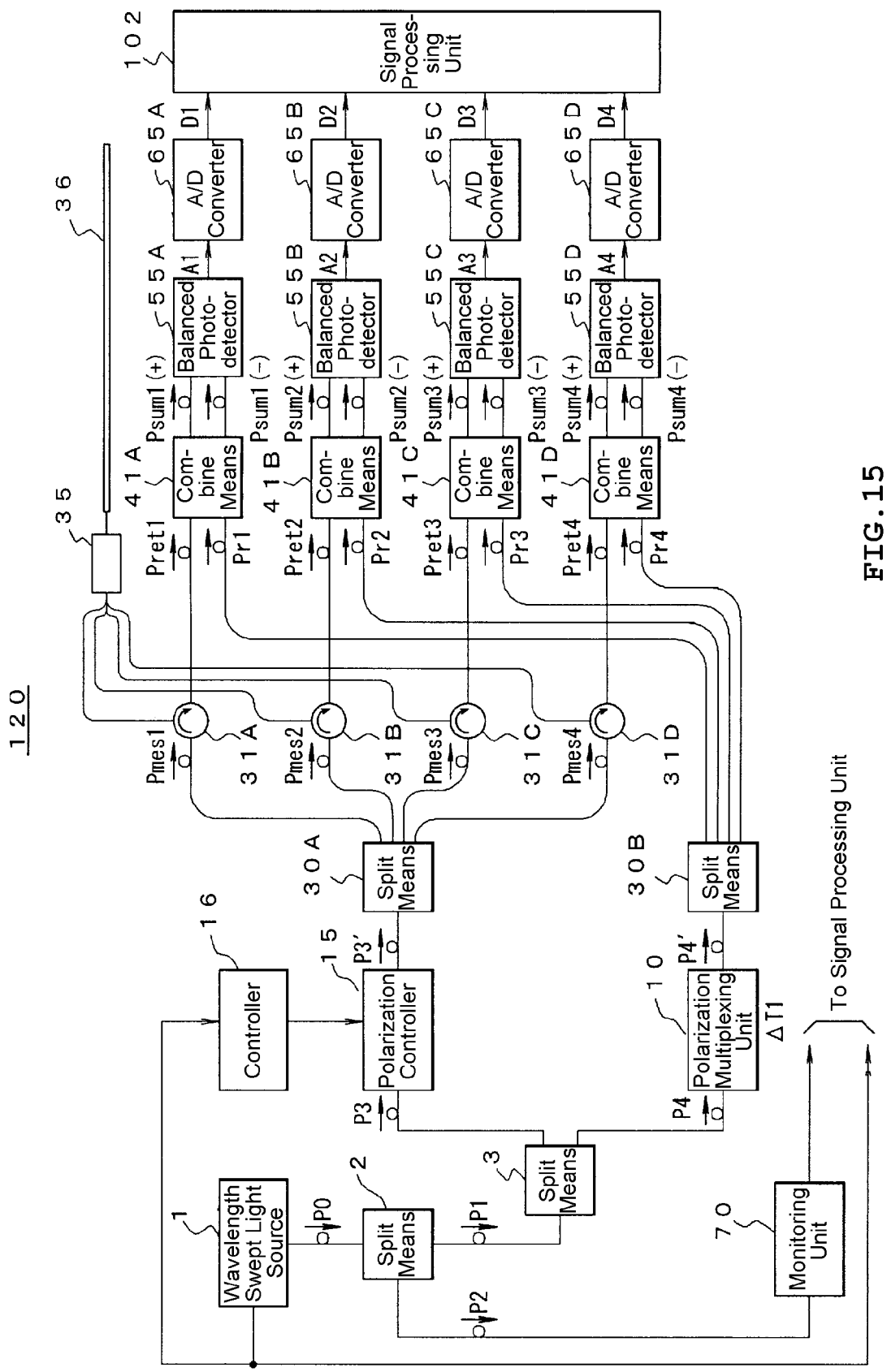
FIG. 15 is a configuration diagram of the embodiment corresponding to a multicore fiber.

In the respective embodiments described above, an example where the measurement-target optical fiber 37 is of a single-core type has been described. FIG. 15 shows a configuration example of a measurement device 120 in which a measurement-target optical fiber is a multicore fiber.

The measurement device 120 has a configuration in which the measurement device 100 having the configuration as shown in FIG. 1 is expanded so as to measure a measurement-target multicore fiber 36 having four cores.

That is, light P0 output from the wavelength swept light source 1 is split into two light beams by split means 2, one light beam P1 is provided to split means 3, split light beam P3 is input to a polarization controller 15, and another split light beam P4 is provided to a polarization multiplexing unit 10.

Then, output light P3' of the polarization controller 15 is split into four light beams with split means 30A, and measurement light Pmes1 to Pmes4 of four systems are respectively output to directional coupling means 31A to 31D. In addition, output light P4' from the polarization multiplexing unit 10 is split into four light beams with split means 30B, and polarization multiplexed reference light Pr1 to Pr4 of four systems are respectively output to combine means 41A to 41D.

The measurement light Pmes1 to Pmes4 are guided to the cores of one measurement-target multicore fiber 36 through the directional coupling means 31A to 31D and a fan-out 35 for a multicore fiber. Reflected light Pret1 to Pret4 from the cores are guided to the combine means 41A to 41D through the fan-out 35 for a multicore fiber and the directional coupling means 31A to 31D, and combined with polarization multiplexed reference light Pr1 to Pr4.

The measurement-target multicore fiber 36 is used for space division multiplexing optical fiber transmission and has a plurality of cores in one clad.

Figure 16:
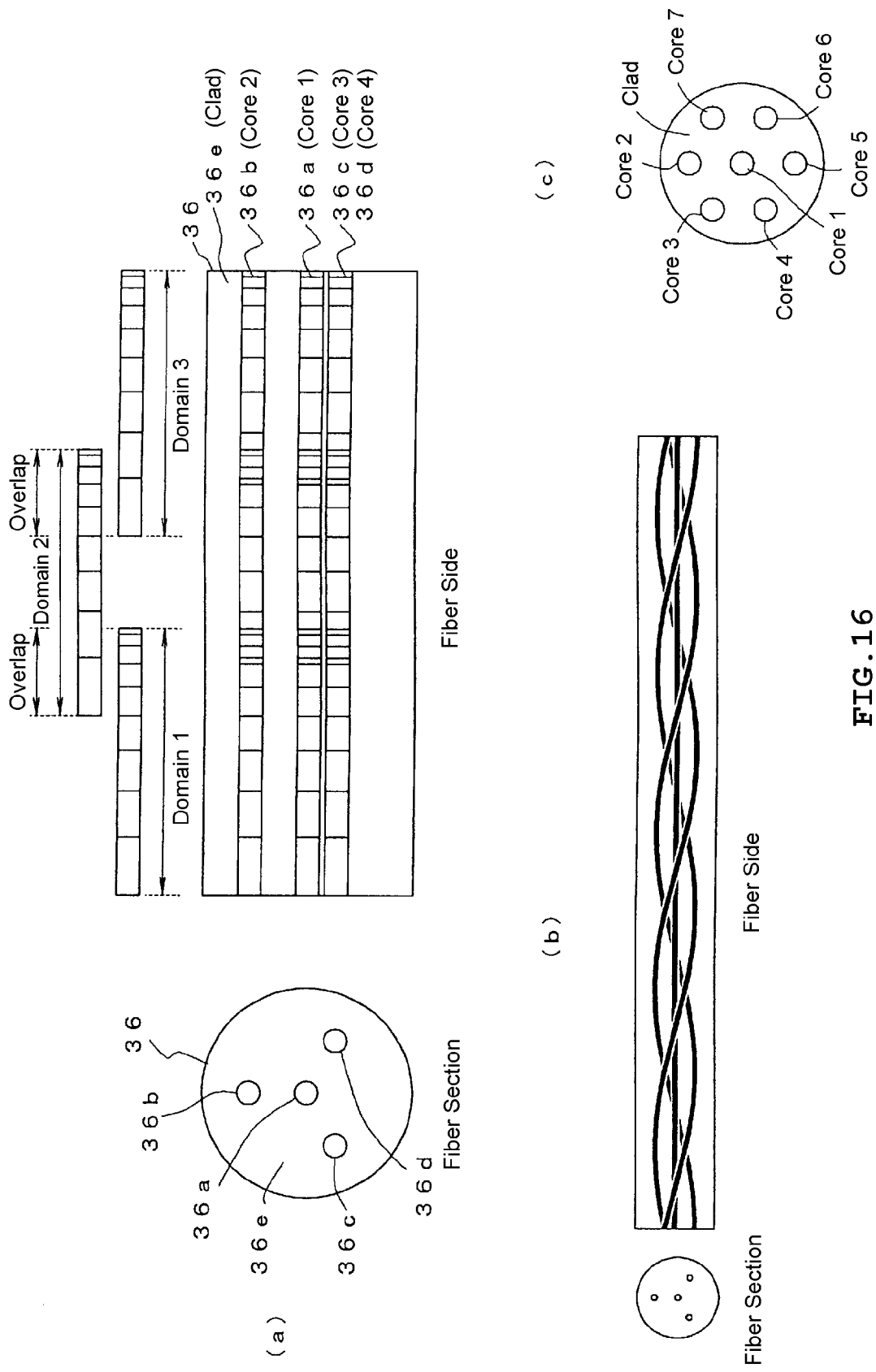
FIG. 16 is a diagram showing a structure example of a multicore fiber.

FIG. 16(a) shows an example of a multicore fiber having a chirped FBG. Three cores 36b to 36d are arranged around a central core 36a, and a chirped FBG is formed in each of the cores 36a to 36d.

In order to measure a three-dimensional position or shape of a measurement-target optical fiber, it is necessary to measure a three-dimensional strain of bending in two directions and twist of the fiber. It is also necessary to perform temperature compensation of the measurement-target optical fiber, and four cores in total are required. When measuring a two-dimensional position or shape, three cores may be provided, and when measuring a one-dimensional position or shape, two cores may be provided. In FIG. 16(a), although all cores 36a to 36d are drawn linearly, in order to measure twist of the measurement-target optical fiber, outer cores need to be twisted spirally around the central core as in FIG. 16(b) in a state where a force is not applied to the measurement-target optical fiber. For space division multiplexing optical fiber transmission, a seven-core fiber in which six cores 2 to 7 are arranged around a central core 1 as in FIG. 16(c) may be used, and only the central core of the seven-core fiber and three cores around the central core may be used to measure a three-dimensional position or shape.

The configuration subsequent to the combine means 41A to 41D corresponds to four sets of the configurations of the measurement device 100 having the configuration shown in FIG. 1. The outputs of the combine means 41A to 41D are respectively input to balanced photodetectors 55A to 55D, outputs A1 to A4 of the balanced photodetectors 55A to 55D are converted to digital signals D1 to D4 with A/D converters 65A to 65D, and the digital signals D1 to D4 are provided to a signal processing unit 102.

Figure 23:
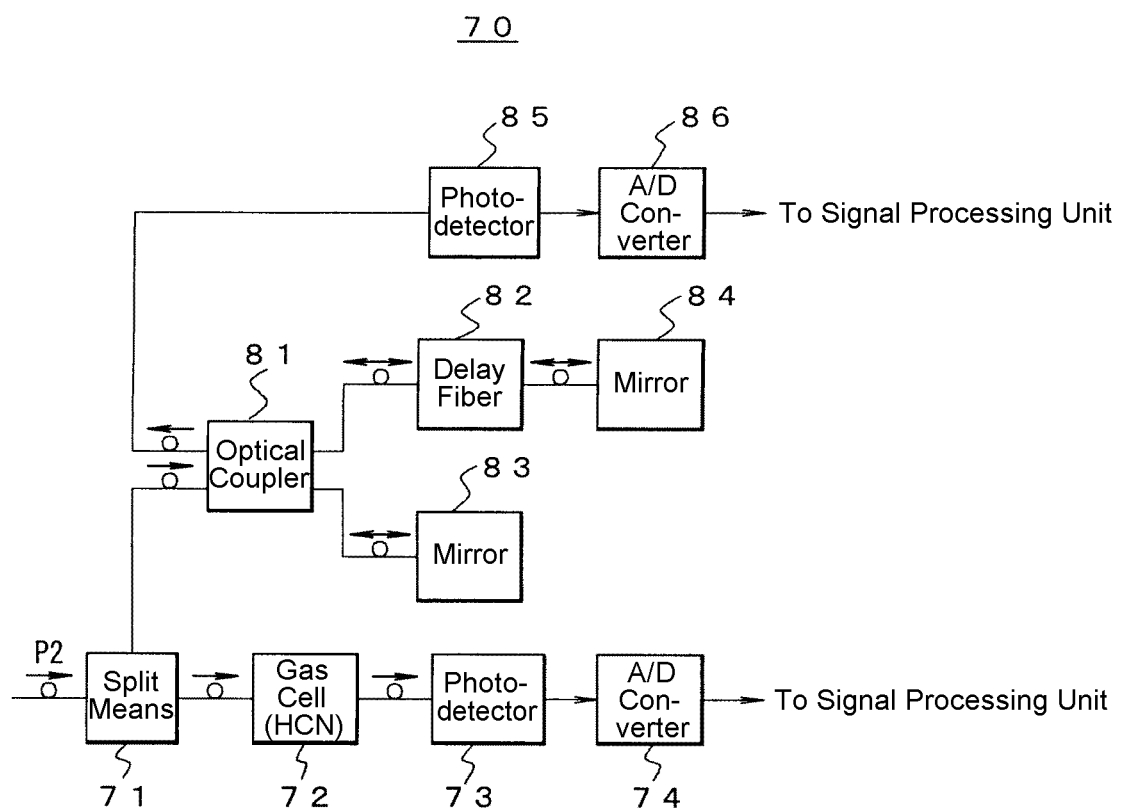
FIG. 23 is a diagram showing a configuration example of a main part of FIG. 22.

The other light beam P2 split with the split means 2 is input to a monitoring unit 70. The configuration and function of the monitoring unit 70 are the same as that shown in FIG. 23.

In the measurement device 120 having this configuration, the same measurement as described above can be performed for each core of the measurement-target multicore fiber 36, a strain of each core of the measurement-target multicore fiber 36 can be accurately measured, and the position or the shape of the measurement-target multicore fiber 36 can be measured using the method described in Patent Document 1.

Figure 17:
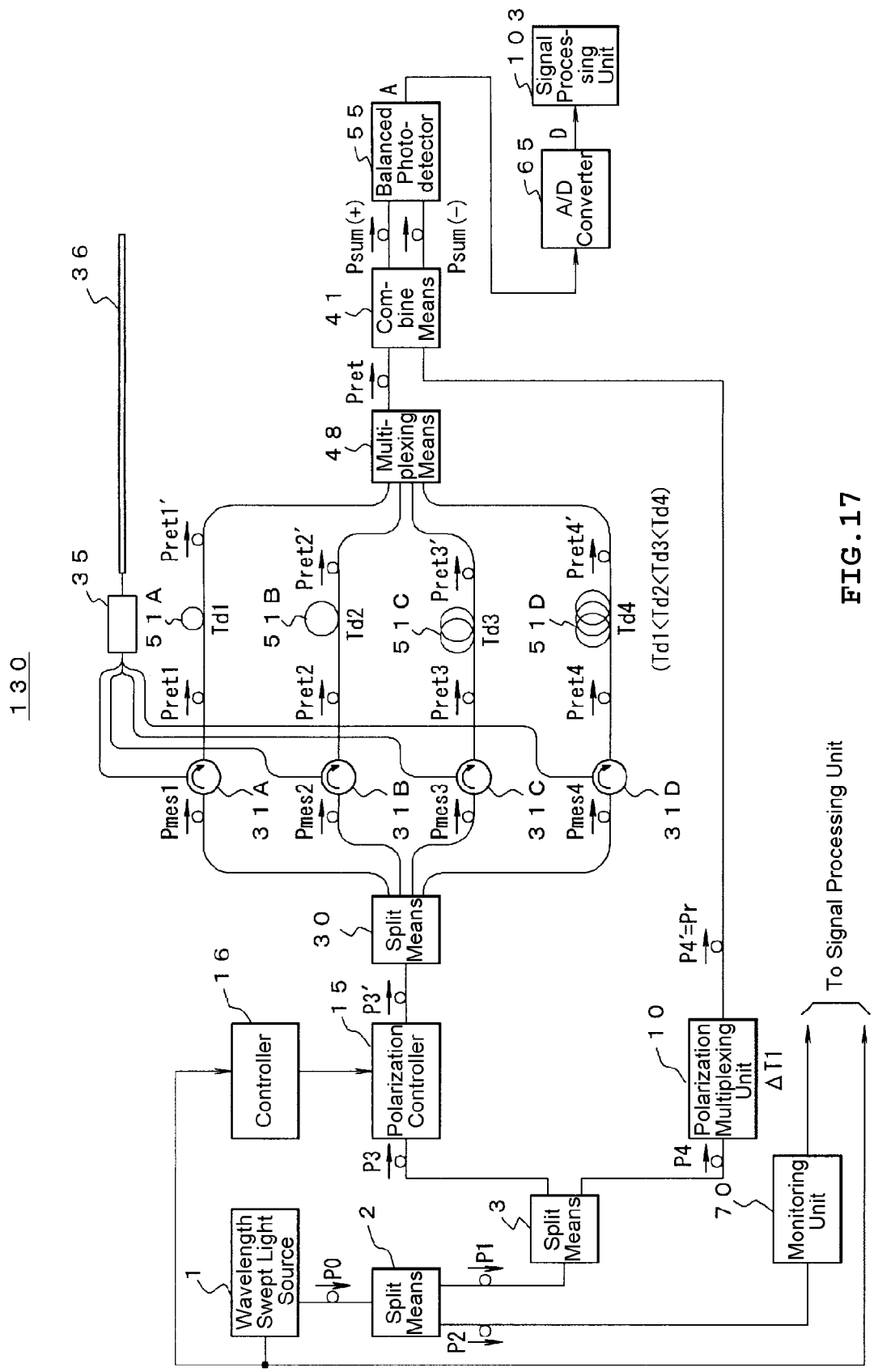
FIG. 17 is another configuration diagram of the embodiment corresponding to a multicore fiber.
Figure 18:
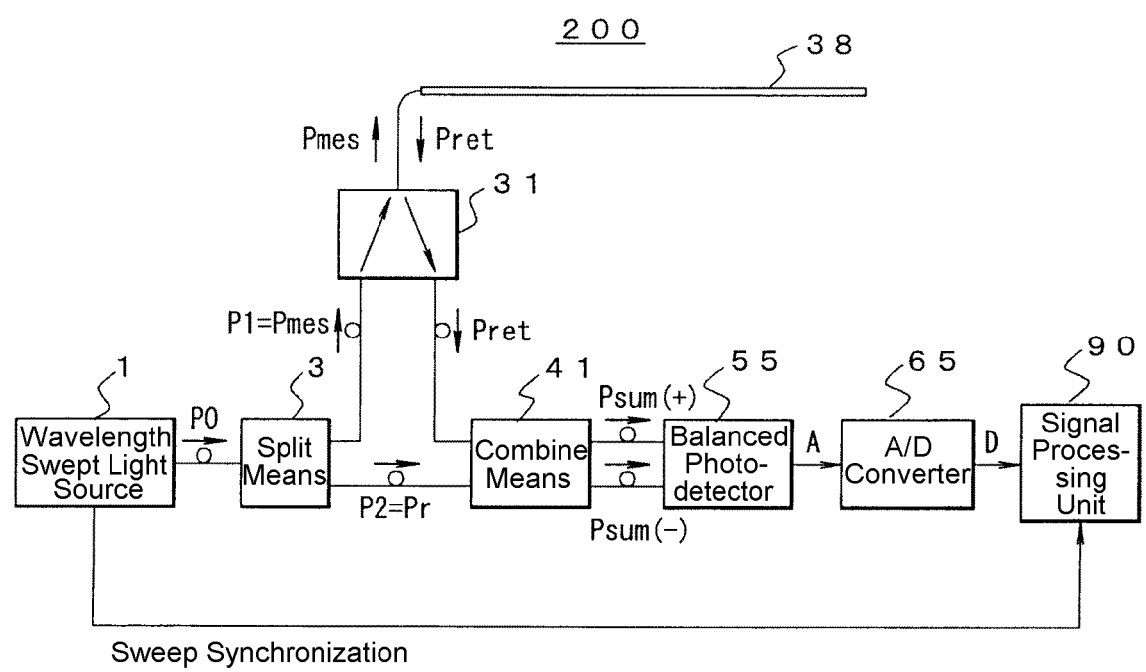
FIG. 18 is a basic configuration diagram of a related art device.
Figure 19:
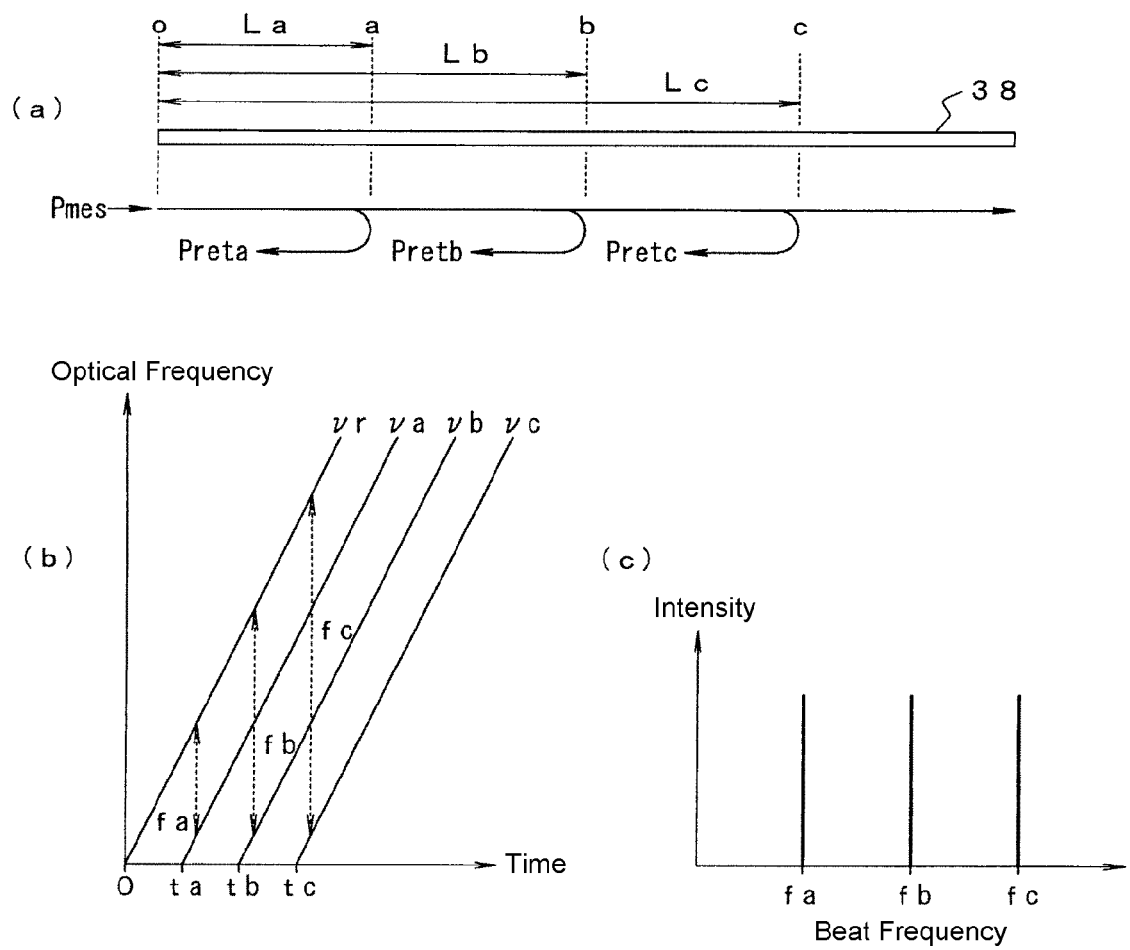
FIG. 19 is a diagram illustrating the basic principle of optical frequency domain reflectometry.
Figure 20:
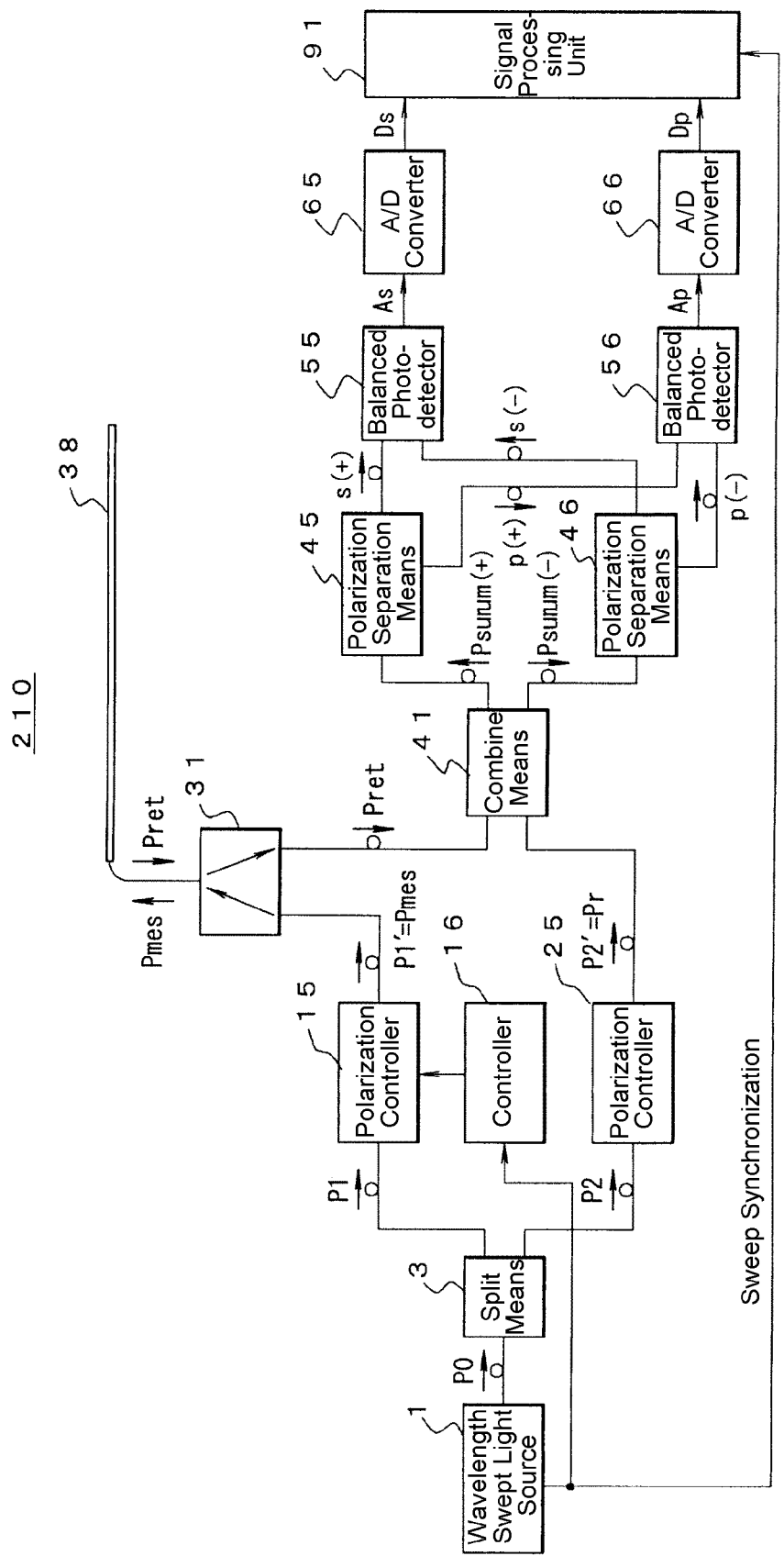
FIG. 20 is a configuration diagram of the related art device in consideration of polarization.
Figure 21:
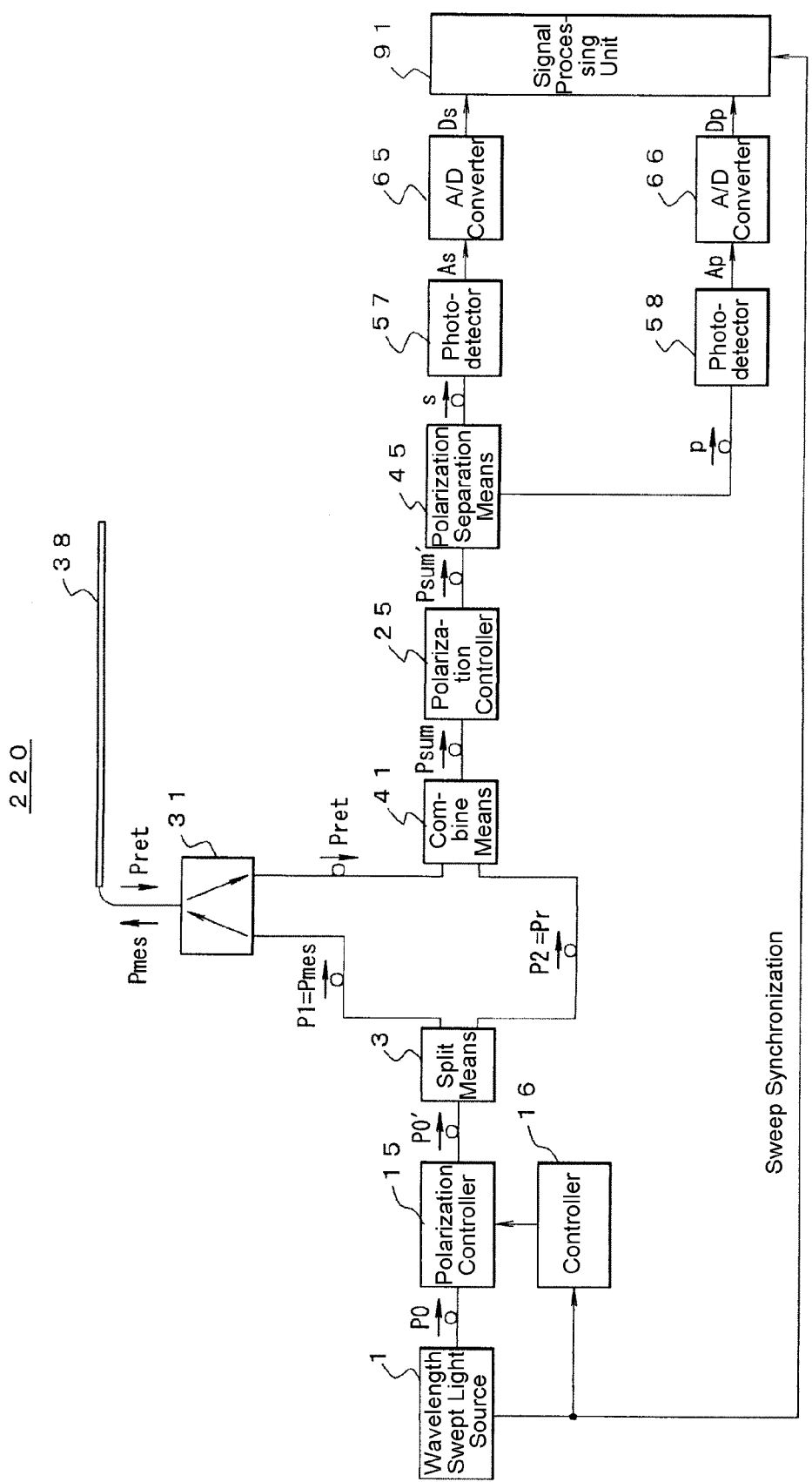
FIG. 21 is another configuration diagram of the related art device in consideration of polarization.
Figure 22:
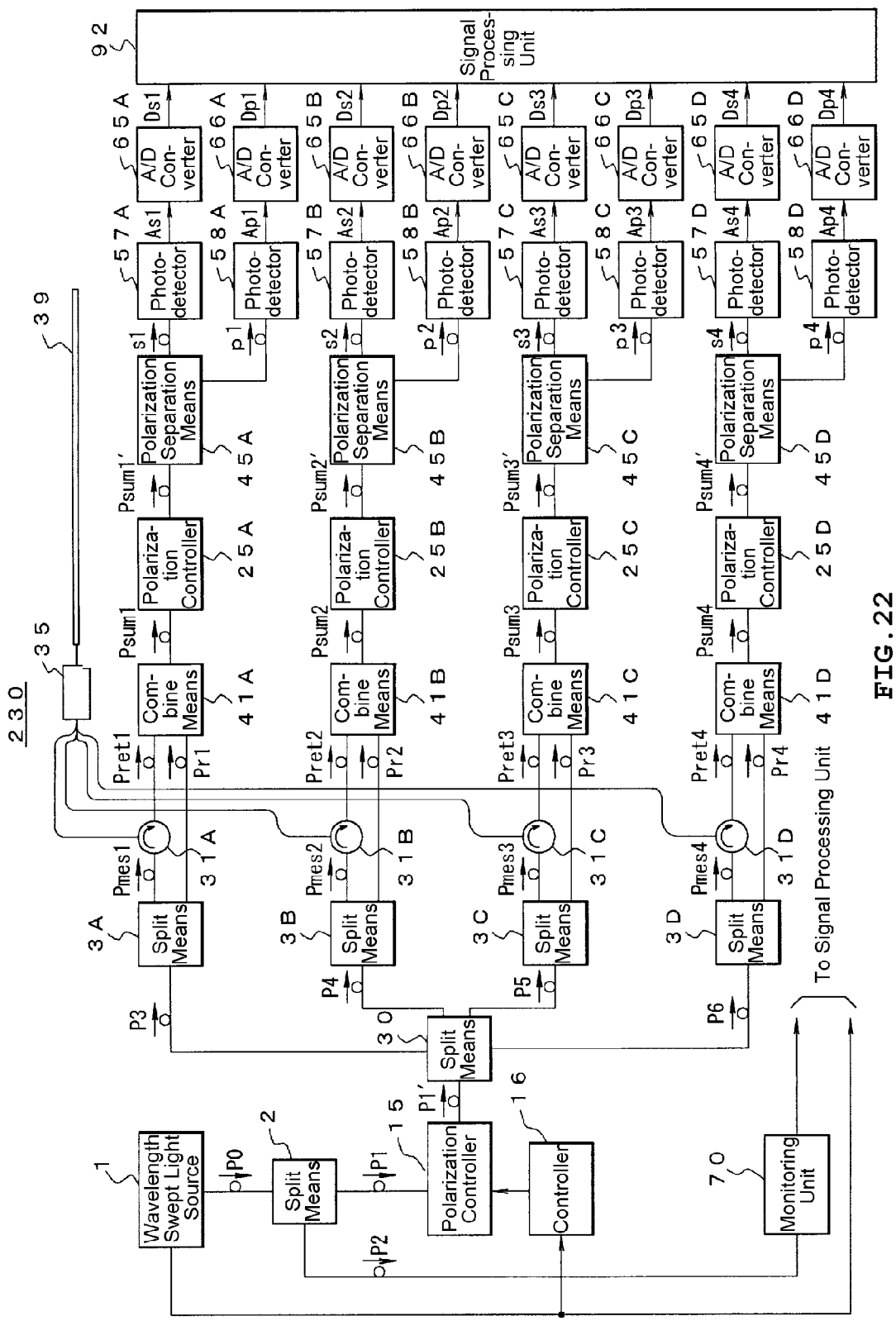
FIG. 22 is another configuration diagram of the related art device corresponding to a multicore fiber.

A measurement device 130 of FIG. 17 has a configuration in which the measurement device 120 shown in FIG. 15 is further simplified. Reflected light Pret1 to Pret4 from the cores of the measurement device 120 of FIG. 15 are applied with different delay times by delay means 51A to 51D constituted of a delay fiber or the like and multiplexed with reflected light multiplexing means 48. In FIG. 17, although the delay means 51A to 51D are inserted between the directional coupling means 31A to 31D and the reflected light multiplexing means 48, the delay means 51A to 51D may be provided between the split means 30 to the directional coupling means 31A to 31D, or between the directional coupling means 31A to 31D and the fan-out 35 for a multicore fiber.

Output light from the reflected light multiplexing means 48 and output light (polarization multiplexed reference light) Pr from the polarization multiplexing unit 10 are provided to the combine means 41, output lights Psum(+) and Psum(−) of the combine means 41 are input to a balanced photodetector 55, an output signal A of the balanced photodetector 55 is converted to a digital signal D with an A/D converter 65, and the digital signal D is provided to a signal processing unit 103. In this case, a single-end photodetector may be used instead of the balanced photodetector 55.

In the case of the measurement device 130, the delay times of reflected light from the four cores of the measurement-target multicore fiber 36 and the delay time of the polarization multiplexing unit 10 are set, for example, at a ratio of 0, 1, 2, 3, and 4, and Fourier transform is performed by dividing the time domain into eight domains or more on the time axis. Therefore, with respect to measurement light in one polarization state, similarly to FIG. 15, eight signals of the Fourier transform results corresponding to the s polarization components of reflected light of the four cores of the measurement-target multicore fiber 36 and the Fourier transform results corresponding to the p polarization components of reflected light of the four cores can be separated, and 16 signals of the Fourier transform results with respect to measurement light in two polarization states can be obtained with two wavelength sweeps.

DESCRIPTION OF REFERENCE NUMERALS AND SIGNS

1: wavelength swept light source, 2, 3, 30A, 30B: split means, 10: polarization multiplexing unit, 31, 31A to 31D: directional coupling means, 41, 41A to 41D: combine means, 55, 55A to 55D: balanced photodetector, 65, 65A to 65D: A/D converter, 70: monitoring unit, 100, 110, 120, 130: optical frequency domain reflectometer, 101 to 103: signal processing unit

What is claimed is:

1. An optical frequency domain reflectometry method comprising:
a step of generating measurement light and reference light having the same wavelength sweep characteristic as wavelength swept light from wavelength swept light which is swept in a wavelength continuously in a predetermined range;
a step of outputting the measurement light to a measurement-target optical fiber having a fiber Bragg grating with a chirped grating interval;
a step of receiving the reference light and generating polarization multiplexed reference light by multiplexing a first reference light and a second reference light resulting from splitting the reference light into a first split reference light and a second split reference light, and applying polarization orthogonality and a predetermined time difference between the first split reference light and the second split reference light, wherein the predetermined time difference is shorter than a time during which a light reciprocates the fiber Bragg grating;
a step of receiving reflected light from the measurement-target optical fiber with respect to the measurement light, combining and inputting the reflected light and the polarization multiplexed reference light to a photodetector, and outputting a beat produced by interference of the reflected light and the polarization multiplexed reference light as an electrical signal;
a step of converting the electrical signal to a digital signal;
a step of dividing a time domain of the digital signal by a single wavelength sweep into a plurality of periods during which a beat frequency produced by interference of the reflected light and the first reference light included in the polarization multiplexed reference light and a beat frequency produced by interference of the reflected light and the second reference light included in the polarization multiplexed reference light do not overlap each other and performing Fourier transform processing on the digital signal; and a step of synthesizing Fourier transform results obtained for the plurality of periods on a distance axis to obtain a measurement result of two orthogonal polarization components of the reflected light.

2. The optical frequency domain reflectometry method according to claim 1, wherein the step of generating the measurement light and the reference light includes a step of alternately switching and generating first measurement light and second measurement light having orthogonal polarizations as the measurement light for each wavelength sweep, in the step of performing the Fourier transform processing, the Fourier transform processing on the digital signal is performed for the first measurement light and the second measurement light by dividing a time domain into the plurality of periods, and in the step of obtaining the measurement result, the measurement result of the two orthogonal polarization components of the reflected light from the measurement-target optical fiber is obtained for the first measurement light and the second measurement light.

3. An optical frequency domain reflectometer comprising:

a wavelength swept light source which outputs wavelength swept light which is swept in a wavelength continuously in a predetermined range;

split means for receiving and splitting the wavelength swept light in a first optical path;

directional optical coupling means for receiving first split light split by the split means and output to a second optical path as measurement light, outputting the first split light to a measurement-target optical fiber having a fiber Bragg grating with a chirped grating interval, and receiving reflected light from the measurement-target optical fiber with respect to the measurement light;

a polarization multiplexing unit which receives second split light split by the split means and output to a third optical path, and outputs polarization multiplexed reference light generated by multiplexing a first reference light and a second reference light resulting from splitting the second split light into a first split reference light and a second split reference light, and applying polarization orthogonality and a predetermined time difference between the first split reference light and the second split reference light using a polarization controller or a half-wave plate, wherein the predetermined time difference is shorter than a time during which a light reciprocates the fiber Bragg grating;

combine means for combining the polarization multiplexed reference light and the reflected light output from the directional optical coupling means;

a photodetector which receives output light of the combine means and outputs a beat produced by interference of the reflected light and the polarization multiplexed reference light as an electrical signal;

an A/D converter which converts the electrical signal to a digital signal; and a signal processing unit which divides a time domain of the digital signal obtained by a single waveform sweep into a plurality of periods during which a beat frequency produced by interference of the reflected light and the first reference light included in the polarization multiplexed reference light and a beat frequency produced by interference of the reflected light and the second reference light included in the polarization multiplexed reference light do not overlap each other, performs Fourier transform on the digital signal, and synthesizes Fourier transform results obtained for the plurality of periods on a distance axis to obtain a measurement result of two orthogonal polarization components of the reflected light.

4. The optical frequency domain reflectometer according to claim 3, further comprising:

polarization switching means inserted into the first optical path for receiving the wavelength swept light or inserted into the second path for receiving the first split light and for switching and outputting first measurement light and second measurement light having the same wavelength sweep characteristic as the wavelength swept light and orthogonal polarizations for each wavelength sweep, wherein the signal processing unit divides and performs the Fourier transform processing on a digital signal obtained by combining reflected light from the measurement-target optical fiber and the polarization multiplexed reference light for the first measurement light and the second measurement light into the plurality of periods, and obtains the measurement result of the two orthogonal polarization components of the reflected light from the measurement-target optical fiber for the first measurement light and the second measurement light.

5. The optical frequency domain reflectometer according to claim 3, wherein the measurement-target optical fiber is divided into a plurality of domains in a longitudinal direction, and each of the plurality of domains has a fiber Bragg grating with a chirped grating interval, and the signal processing unit performs Fourier transform processing on a digital signal obtained when the wavelength of the measurement light is swept once by dividing the time domain into a plurality of periods during which a beat frequency produced by interference of reflected light from the plurality of domains of the measurement-target optical fiber with respect to the measurement light and the first reference light included in the polarization multiplexed reference light and a beat frequency produced by interference of the reflected light from the plurality of domains of the measurement-target optical fiber with respect to the measurement light and the second reference light included in the polarization multiplexed reference light do not overlap each other.

6. The optical frequency domain reflectometer according to claim 5, wherein the predetermined time difference of the polarization multiplexing unit is set to be shorter than a time during which a light reciprocates in any domain of the measurement-target optical fiber.

7. The optical frequency domain reflectometer according to claim 5, wherein reflection wavelength ranges of the plurality of domains of the measurement-target optical fiber are formed so as to partially overlap each other, and a wavelength sweep range of the wavelength swept light source reaches a portion where the reflection wavelength ranges of the measurement-target optical fiber overlap each other.

8. The optical frequency domain reflectometer according to claim 3, wherein the measurement-target optical fiber is a multi-core fiber having a plurality of M cores or more, and in order to provide the measurement light to a plurality of M cores among the cores of the multicore fiber and to obtain beat signals obtained by interference of reflected light from the plurality of M cores and the polarization multiplexed reference light, a plurality of M sets of the directional coupling means, the combine means, the photodetectors, and the A/D converters are provided.

9. The optical frequency domain reflectometer according to claim 3,
wherein the measurement-target optical fiber is a multi-core fiber having a plurality of M cores or more,
a plurality of M sets of directional coupling means are provided in order to provide the measurement light to a plurality of M cores among the cores of the multicore fiber and to receive reflected light from the plurality of M cores with respect to the measurement light,
the optical frequency domain reflectometer further comprises:
reflected light multiplexing means for multiplexing reflected light from the plurality of M cores through the directional coupling means; and
means for applying a delay time difference such that reflected light from the plurality of M cores is multiplexed with different delay times for the respective cores in the reflected light multiplexing means, and processing on the output of the reflected light multiplexing means is performed with one set of the combine means, the photodetector, and the A/D converter.

10. The optical frequency domain reflectometer according to claim 8, wherein M is 4.

11. The optical frequency domain reflectometer according to claim 9, wherein M is 4.

12. A device for measuring a position or a shape,
wherein the position or the shape of a measurement object to which a measurement-target optical fiber is fixed is measured using the optical frequency domain reflectometer according to claim 8.

13. The device according to claim 12, wherein the measurement object is a medical catheter, a medical inspection probe, a medical sensor, a construction inspection sensor, a sea-floor sensor, or a geological sensor.

14. A strain distribution measurement system for an optical fiber comprising:
a measurement-target optical fiber which has a fiber Bragg grating with a chirped grating interval; and
the optical frequency domain reflectometer according to claim 3.

* * * * *